(12) United States Patent
Yamamoto

(10) Patent No.: US 7,536,432 B2
(45) Date of Patent: May 19, 2009

(54) PARALLEL MERGE/SORT PROCESSING DEVICE, METHOD, AND PROGRAM FOR SORTING DATA STRINGS

(75) Inventor: Noboru Yamamoto, Koriyama (JP)

(73) Assignee: Nihon University School Juridical Person, Tokyo (JP)

( * ) Notice: Subject to any disclaimer, the term of this patent is extended or adjusted under 35 U.S.C. 154(b) by 614 days.

(21) Appl. No.: 10/511,683

(22) PCT Filed: Apr. 25, 2003

(86) PCT No.: PCT/JP03/05319

§ 371 (c)(1),
(2), (4) Date: Oct. 19, 2004

(87) PCT Pub. No.: WO03/091872

PCT Pub. Date: Nov. 6, 2003

(65) Prior Publication Data

US 2005/0144167 A1    Jun. 30, 2005

(30) Foreign Application Priority Data

Apr. 26, 2002    (JP) .............................. 2002-125838

(51) Int. Cl.
*G06F 15/16* (2006.01)
(52) U.S. Cl. ........................... 709/201; 709/206; 707/7; 712/218
(58) Field of Classification Search ................. 709/201, 709/226; 707/7; 712/218
See application file for complete search history.

(56) References Cited

U.S. PATENT DOCUMENTS 5,721,957 A * 2/1998 Huang et al. .................. 710/66

(Continued)

FOREIGN PATENT DOCUMENTS

JP    A 1-288920    11/1989

(Continued)

*Primary Examiner*—Saleh Najjar
*Assistant Examiner*—Thuong (Tina) T Nguyen
(74) *Attorney, Agent, or Firm*—Oliff & Berridge, PLC

(57) ABSTRACT

In the basic form of merge processing, that is sort processing, two sorted partial data string pairs are input, and one series of sorted data string is output as a whole. Conventionally, high parallelism of this processing has been considered difficult. A method for dividing a sorted partial data string pair into a plurality of segment pairs, if invented, would allow an advanced parallel merge processing to be performed even in a homogeneous configuration parallel computer system, such as a tightly coupled multi-processor sharing a main storage. The basis of merge processing is processing to input a pair of two sorted partial data strings and to output one sorted data string. A method for sub-dividing this input data string pair into arbitrary data string pairs from the first part of both data strings of the input data string pair, while considering the magnitude of the key value, has been invented. This method, if implemented, enables a merge operation at a parallelism k if the data string is divided into any number of data string pairs, for example, k sets of data string pairs, and if merging in descending order (merging the data string pair from the first part to the last part thereof, and outputting it from the first part to the last part in the output area) and merging in ascending order (merging the data string pair from the last part to the first part thereof and outputting it from the last part to the first part in the output area) are used, a merge operation with a parallelism 2k can also be possible.

4 Claims, 14 Drawing Sheets

U.S. PATENT DOCUMENTS

| | | | |
|---|---|---|---|
| 5,852,826 A * | 12/1998 | Graunke et al. | 707/7 |
| 5,903,780 A * | 5/1999 | Fushimi | 712/300 |
| 5,924,093 A | 7/1999 | Potter et al. | |
| 6,036,350 A * | 3/2000 | Mennemeier et al. | 708/201 |
| 6,144,986 A * | 11/2000 | Silver | 709/201 |
| 2002/0065793 A1 * | 5/2002 | Arakawa et al. | 707/1 |
| 2004/0221138 A1 * | 11/2004 | Rosner et al. | 712/218 |

FOREIGN PATENT DOCUMENTS

| | | | |
|---|---|---|---|
| JP | A 2000-3342 | 1/2000 | |

* cited by examiner

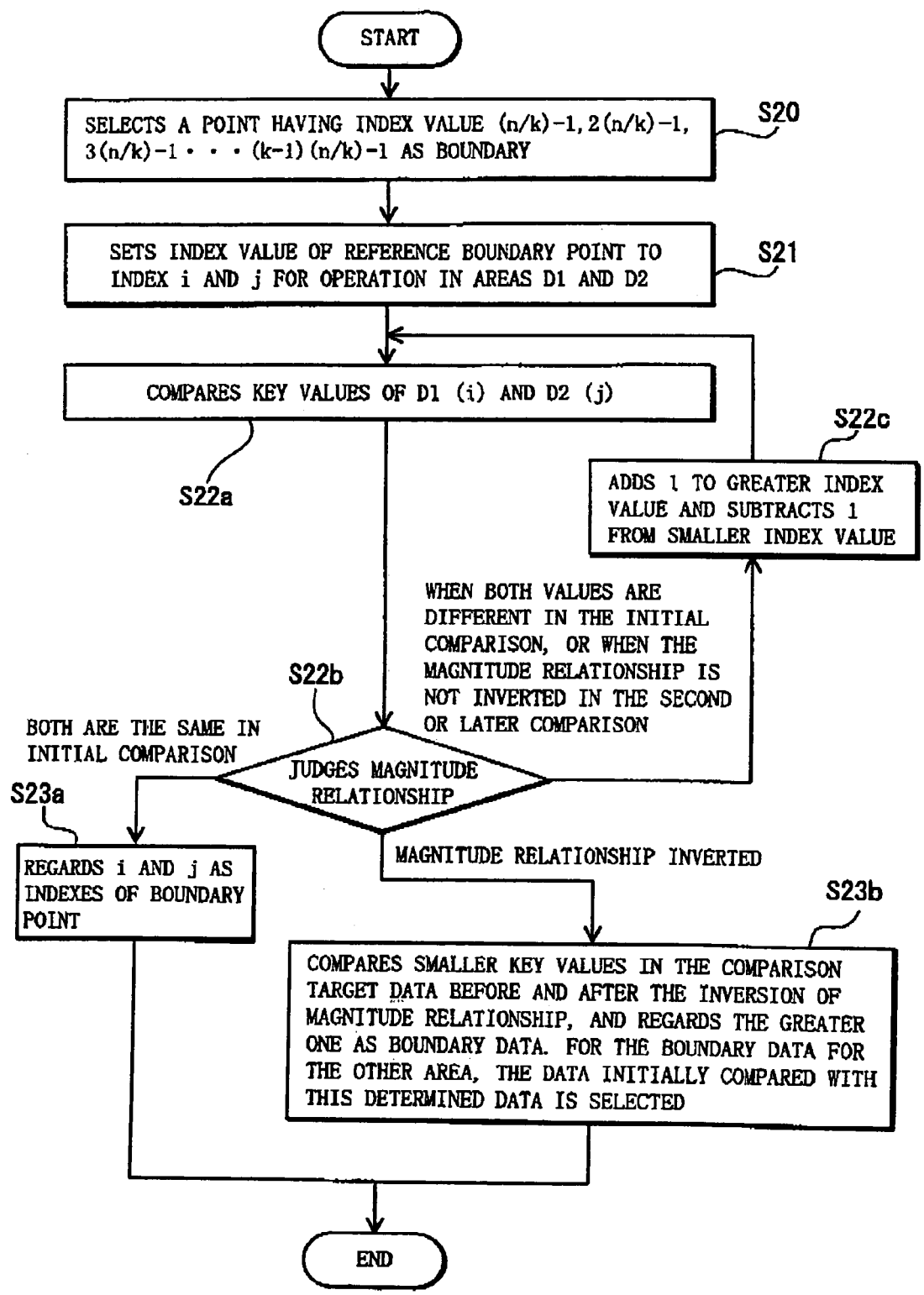

PARALLEL MERGE/SORT PROCESSING DEVICE, METHOD, AND PROGRAM FOR SORTING DATA STRINGS

TECHNICAL FIELD

The technology to be a core of the present invention is a technology to sub-divide two sorted data string pairs into a plurality of sorted partial data string pairs while considering the magnitude of the key value so as to perform merge/sort processing at an arbitrary number of parallelism with inputting two sorted data strings.

As an example of using this technology, the parallel two-branching merge/sort method will be described first. At first, an unsorted data string is divided by the number of available processors and the sort operation is performed in parallel, so as to generate the sorted partial data strings for the number of parallelism. Then the merge operation is performed using the two sets of sorted partial data strings as a pair, but in order to increase the processing speed, the input data string pair is sub-divided into the required number of data string pairs, and merge operation is performed in parallel respectively. For this output, the output area is specified by the parameters at execution of each merge operation, so that the result becomes the same as that when one merge operation is performed without sub-division. The present invention relates to a parallel merge/sort processing device, method, and program characterized in that this operation is repeated until a single sorted data string is received.

BACKGROUND ART

Data sorting is one of the basic processings using a computer. Sort processing and merge processing are operations for receiving one series of data strings by sorting the data strings which were input in ascending order (from small to large) or descending order (from large to small) on the information on the target field. In the merge operation, two or more series of data (sort target data or record) strings sorted in ascending order (or descending order) are received, and one series of data strings sorted in ascending order or descending order is output.

The number of input series varies, as in 2, 3, 4, . . . , but the case of 2 is particularly efficient since one unit of a data sort position can be defined by one comparison.

Since the order of time required for merge processing is in proportion to the number of data (n), the merge operation is advantageous compared with the sort operation, of which the order of required time is in proportion to $n^2$ or $n\log_2 n$. However, the required time increases as the data count increases, so a high-speed algorithm (calculation method) is demanded. The development of a high performance algorithm may expand the merge/sort application range. But this operation is simple, the comparison of two key values, so the possibility of finding factors to decrease time is low. The present invention would allow the parallelism of merge processing using two sorted partial data string pairs as input, which has been considered difficult in conventional technology.

Decreasing processing time by performing merge processing on volumes of data simultaneously in parallel using a parallel processor has been proposed. However, in many cases a special topology is required for the connection network between processors or a processor with special functions and structure is required, and this implementation is difficult for a general purpose computer system, such as a tightly-coupled multi-processor sharing a main storage. The present invention implements a merge/sort method, which has high parallelism even when a general purpose processor, that has no special configuration or connection, is used, but if such a method is not used, processing efficiency becomes very low, as the following examples show.

As an example of a parallel merge/sort method that can be applied to a general purpose parallel processor system, the parallel two-branching merge/sort calculation method will be described. FIG. 13 is a flow chart thereof, and FIG. 14 is a diagram depicting the processing when the number of processors is eight.

With reference to FIG. 13, the processing target unsorted data string (input data) is divided into p sets of data strings (where $p=2^q$, q is an integer), which corresponds to the number of processors (S100). Using the p number of processors, the divided p sets of unsorted data strings are sorted independently and in parallel by a quick sort method, for example (S101). By performing q steps of merge processing for the p sets of sorted partial data strings (S102), one set of sorted data strings can be finally acquired as a whole (S103).

With reference to FIG. 14, processing when the number of processors is eight will be described. In FIG. 14, a circle indicates a processor, and a square indicates a data string or an area where a data string (D) is stored. The symbol in the circle indicates the content of processing to be executed by the processor, where S indicates sort processing, M indicates merge processing, and V indicates transfer processing to another storage area, which is executed when necessary.

The unsorted data strings in the input area are divided into eight partial data strings. The eight processors P1-P8 execute sort processing of these partial data strings simultaneously in parallel. The processing results are stored in the areas D11-D18.

Then the merge processing in the first step is executed. The data strings D11 and D12 are merged by the processor P1 and stored in the area D21, the data strings D13 and D14 are merged by the processor P3 and stored in the area D22, the data strings D15 and D16 are merged by the processor P5 and are stored in the area D23, and the data strings D17 and D18 are merged by the processor P7 and stored in the area D24. In the first step, the processors P2, P4 and P8 are not used. (Here processors are assigned for the sake of convenience. This is the same for the description herein below.)

Then the merge/sort in the second step is executed. The data strings D21 and D22 are merged by the processor P1, and stored in the area D31, and the data strings D23 and D24 are merged by the processor P5 and stored in the area D32. In the second step, the processors P2, P3, P4, P6, P7 and P8 are not used.

Then the merge/sort in the third step is executed. The data strings D31 and D32 are merged by the processor P1 and stored in the area D4. The merge/sort is now completed. In the third step, the processors P2, P3, P4, P5, P6, P7 and P8 are not used. The acquired result, D4, is transferred to the final output area by the eight processors if necessary.

In the above-mentioned conventional method, processors which are not used increase as the merge processing steps advance, so the processing capability of the processors is wasted. In the case of the above example, only 50% of the processors are used in the merge processing in the first step, and this processor utilization ratio is 25% in the merge processing in the second step, and 12.5% in the merge processing in the third step, thus the number of processors which are not used increases as the processing steps advance. This is because the number of sorted partial data strings decreases to half each time the merge processing steps advance.

Also the number of data to be merged by one processor increases to double as the steps advance, so processing time increases. In the case of a system which gives priority to high-speed processing, this increase of processing time, due to the increase of the data volume to be handled by one processor, becomes a more serious problem than the problem of a drop in the utilization ratio of the processors.

With solving the above problems in view, it is an object of the present invention to provide a parallel merge/sort processing device, method, and program which can increase the utilization efficiency of the processor in the merge/sort processing using parallel processors, and can decrease processing time.

DISCLOSURE OF THE INVENTION

[Paragraph 0014]

The present invention decreases the time required for merge processing by sub-dividing two sorted partial data string pairs, to be the input of the merge processing, into arbitrary data string pairs, and performing merge processing in parallel. Since a shared data group is referred to by a plurality of processors, the present invention is particularly effective for parallel processors where a plurality of processors are connected sharing a main storage, but can be applied to any parallel processors in an environment where a data group can be referred to by each processor.

In parallel two-branching merge/sort processing, an unsorted input data string is divided into a plurality of sets, and sort processing is executed for each set and sorted partial data strings are created. Hereafter, two sets of existing sorted partial data strings are paired and merge processing is performed to output one set of sorted partial data, and this processing step is repeated until the number of output data strings finally becomes one. In each merge processing step, merge processing is executed in parallel as long as there are a plurality of data string pairs to be input.

Parallel processing of merge processing, which is one unit job or task, is impossible with conventional technology, where parallelism decreases by half and processing time doubles as the merge processing steps advance.

According to the present invention, a pair of two sets of sorted partial data strings (sorted partial data strings acquired by the sort processing or merge processing shown in FIG. 14) to be the input of the merge processing are sub-divided into a plurality of sorted partial data string pairs, so the processors for the number of sub-divisions can be used, and time required for the sort processing can be decreased.

In order to increase parallelism, the following method can also be used. In other words, a method for starting merge operation from the side of which the key value is greater (start end) for two sets of sorted data string pairs to be input, using two processors, and outputting the result in descending order from the start end of the output area (merging in descending order), and a method for starting merge operation from the side of which the key value is smaller (termination end) and outputting the result in ascending order from the termination end of the output area (merging in ascending order), are executed simultaneously in parallel.

Since this method imposes no restrictions, this method can be easily implemented in an environment where a plurality of tasks can operate in parallel.

In the following description, only "sorting in descending order by one key" will be described for the sake of convenience. "Sort" and "merge" are used for terms related to sorting.

The parallel merge/sort processing device according to the present invention is basically comprised of a mechanism for dividing two series of input data string pairs into a plurality of sets of two series of input data string pairs used for the merge operation of a conventional method, and a mechanism for performing merge operation to these sets in parallel.

How to assign the processor group to both mechanisms is arbitrary. In other words, a plurality of processors may execute the sub-division of the data string pair and then the processors are reassigned for the merge processing, or a same processor may be in-charge of the sub-division operation of the data string and the merge operation thereafter.

The output of the respective merge operation must have a sane result as the case of executing one merge operation. For this, in each merge operation which operates in parallel, the result must be output to an area corresponding to the magnitude of the key value of the entire sub-divided input data string pairs.

The processor group assigned to the partial data string pairs executes merge processing respectively, and also outputs the result of the merge processing to the pre-instructed area. For this, the pair at the first memory address of the area where the input data string pairs of the merge processing are stored, the number of data to be processed, and the first address of the output area, are specified by the management processor, for example.

Two processors are assigned to each one of the partial data string pairs, and the first processor executes merge processing in descending order from one end (side at which the key value is greater) of the partial data string, and the second processor simultaneously executes merge processing in ascending order from the other end (side at which the key value is smaller) of the same partial data string, wherein the first processor writes the result of the merge processing sequentially from the one end of the partial data string, and the second processor writes the result of the merge processing sequentially from the other end of the part of this area.

[Paragraph 0020]

As described in paragraph 0014, one data string pair is sub-divided into a plurality of data string pairs, but in the sub-division, the operation to divide into data strings in which a specified number x of data exists from the specified start point of the data string pair and the rest of the data strings can be repeated with changing x.

Therefore the basis of the sub-division is dividing the data strings into two, and the two sorted partial data string pairs acquired as a result must satisfy the following conditions.

The sorted data string D comprised of n number of data is expressed as (D, n), and a pair of two data strings is expressed as $\{(D_1, n), (D_2, n)\}$.

When the pair of sorted data strings, $\{(D_1, n), (D_2, n)\}$, is divided into two partial data strings $\{(D_{11}, n_{11}), (D_{21}, n_{21})\}$, and $\{(D_{12}, n_{12}), (D_{22}, n_{22})\}$, and these partial data strings are used for merge processing, the following formula must be established in order to output such that the magnitude of key values does not contradict the entire data strings.

The smaller one of the key values of the last part of the data in the partial data strings $D_{11}$ and $D_{21} \geqq$ greater one of the key values of the first part of the data in the partial data strings $D_{12}$ and $D_{22}$.

$n_{11}+n_{21}$=the number of data included in the significant data string pairs divided into 2

A parallel merge/sort processing method according to the present intention is a method for performing merge/sort processing using a parallel processor which includes a plurality of processors, where one unsorted data string, or two sorted partial data strings, or one of three or more sorted partial data strings and attribute information thereof (e.g. type, location information of data and number of data) are received as an input, comprising:

a first step of dividing a data string and acquiring a plurality of unsorted partial data strings when the sorting target is an unsorted data string;

a second step of assigning a processor to said plurality of partial data strings for sorting respectively;

a third step of sorting each of said plurality of partial data strings independently by the assigned processor and outputting the sorted partial data strings in descending order;

a fourth step of creating an input data string pair for merging/sorting using arbitrary two sorted partial data strings which were acquired in the third step or the seventh step or was input as initial data, and dividing the pair into a required number of sub-divided partial data string pairs respectively under a predetermined division condition;

a fifth step of editing the job information required for merge processing on the sub-divided partial data string pairs;

a sixth step of assigning a processor to each merge processing;

a seventh step of performing merge processing by the assigned processor and outputting sorted partial data strings; and a step of repeating the fourth step to the seventh step until the number of output data strings becomes one.

The above, however, is applied when one unsorted data string is provided, and the first step to the third step are unnecessary it two or more sorted data strings are provided.

The repeat of the fourth step to the seventh step ends in the stage when the merge-processed sorted partial data strings are merged into one data string. If two sorted data strings are provided, the fourth to seventh steps are executed only once, and a repeat is not required.

It is preferable that in the sixth step, two processors are assigned to the partial data string pair, and in the seventh step, the first processor performs merge processing in descending order from one end (side of which the key value is greater) in the partial data string, and the second processor performs merge processing in ascending order from the other end (side of which the key value is smaller) in the same partial data string simultaneously.

(Deciding the Position of the First Part in the Insignificant Data String Pair After Two-division is Performed)

The two-division method for a data string pair shown in paragraph 0020 will be described below.

This method comprises:

a step of setting x as an initial value of the index variables i and j for specifying the individual data in the data strings $D_1$ and $D_2$ (e.g. when the data string pairs, with 10,000 data in each data string, are divided into 10 segments of data string pairs, with 1000 data in each data string, x=1000 is set as the number of data, and 1000, . . . 9000 is set for the initial index of division positions);

a comparison step of comparing a key value of data indicated by the index variable i of the data string $D_1$ and a key value of data indicated by the index variable j of the data string $D_2$;

a step of adding 1 to an index variable with a greater key value, subtracting 1 from an index value with a smaller key value, and then branching processing to the comparison step, if the key value of the data indicated by the index variable i of $D_1$ and the key value of the data indicated by the index variable j of $D_2$ are not the same in the initial comparison;

a step of adding 1 to the greater index variable, and subtracting 1 from the smaller index variable, and then branching processing to the comparison step, if the magnitude relationship of the key value of the data indicated by the index variable i of $D_1$ and the key value of the data indicated by the index variable j of $D_2$ is unchanged in the second or later comparison;

a step of regarding the data indicated by the index variable i and the data indicated by the index variable j as a division boundary respectively, if the key value of the data indicated by the index variable i of $D_1$ and the key value of the data indicated by the index variable j of $D_2$ are the same in the initial comparison;

a step of comparing the greater one of the key value of $D_1$ and the key value of $D_2$ in the previous comparison operation with the greater one of the key value of $D_1$ and the key value of $D_2$ in the current comparison operation and regarding the data with the smaller key value as the division boundary and the data initially compared with this data as the other boundary, if the magnitude relationship between the key value of the data indicated by the index variable i of $D_1$ and the key value of the data indicated by the index variable j of $D_2$ is inverted from the previous magnitude relationship (the case when the key values are the same is also regarded as an inversion in the second or later comparison).

The processing is used for determining the position of the first part of the latter half data string pair $\{(D_{12}, n_{12}), (D_{22}, n_{22})\}$ after two-division is performed, in other words, for determining the start point of merging in descending order.

(Deciding the Position of the Last Part in the Significant Data String Pair After Two-division is Performed)

The two-division method shown in paragraph 0020 will be described below.

This method comprises:

a step of setting x−1 as an initial value of the boundary index value for the index variable i and j for specifying individual data in the data strings $D_1$ and $D_2$ (e.g. when the data string pairs, with 10,000 data in each data string, are divided into 10 segments of data string pairs, with 1000 data in each data string, 1000 is set for X as the number of data, and 999, 1999, . . . 8999 is set for the initial index of division position);

a comparison step of comparing a key value of data indicated by the index variable i of the: data string D1 and a key value of data indicated by the index variable j of the data string D2;

a step of adding 1 to an index variable of the data with greater key value, subtracting 1 from an index variable of the data with smaller key value, and then branching processing to the comparison step, if the key value of the data indicated by the index variable i of $D_1$ and the key value of the data indicated by the index variable j of $D_2$ are not the same in the initial comparison;

a step of adding 1 to an index variable of the data with a greater key value, subtracting 1 from an index variable of the data with a smaller index value, and then branching processing to the comparison step, if the magnitude relationship of the key value of the data indicated by the index variable i of $D_1$ and the key value of the data indicated by the index variable j is unchanged in the second or later comparison;

a step of regarding the data indicated by the index variable i and the data indicated by the index variable j as a division boundary respectively, if the key value of the data indicated by the index i of $D_1$ and the key value of the data indicated by the index variable j are the same in the initial comparison;

a step of comparing the smaller one of the key value of $D_1$ and the key value of $D_2$ in the previous comparison operation with the smaller one of the key value of $D_1$ and the key value of $D_2$ in the current comparison operation, and regarding the data with a greater key value as the division boundary and regarding the data initially compared with this data as the other boundary, if the magnitude relationship between the key value of the data indicated by the index variable i of $D_1$ and the key value of the data indicated by the index variable j of $D_2$ is inverted from the previous magnitude relationship (the case when the key values are the same is also regarded as an inversion in the second or later comparison). This processing is used for determining the position of the last part of the first half data string pair $\{(D_{11}, n_{11}), (D_{21}, n_{21})\}$ after two-division is performed, in other words, for determining the start point of merging in ascending order.

The present invention is a parallel merge/sort processing method for sub-dividing two sets of sorted data string pairs to be the input of merging/sorting into a plurality of data string pairs while considering the magnitude distribution of key values, so as to enable a merge/sort processing at an arbitrary parallelism, comprising: a step of providing a first sorted data string and a second sorted data string; a step of sub-dividing the pair of the first data string and the second data string into a plurality of sorted partial data string pairs according to a required parallelism, considering the magnitude of the key values from the first part in both data strings; and a step of inputting the divided sorted partial data string pairs and merging them in parallel.

The present invention is a program for performing parallel merge/sort processing using a parallel processor which includes a plurality of processors, where one unsorted data string or two sorted partial data strings, or one of three or more sorted partial data strings and attribute information thereof (e.g. type, location information of data, number of data) are received as an input, comprising:

a first step of dividing a data string and acquiring a plurality of unsorted partial data strings when the sorting target is an unsorted data string;

a second step of assigning a processor to the plurality of partial data strings for sorting respectively;

a third step of sorting each of the plurality of partial data strings independently by the assigned processor and outputting a sorted partial data string in descending order;

a fourth step of creating an input data string pair for merging/sorting using arbitrary two sorted partial data strings which were acquired in the third step or the seventh step or was input as initial data, and dividing the pair into the required number of sub-divided partial data string pairs respectively under a predetermined condition;

a fifth step of editing the job information required for merging the sub-divided partial data string pairs;

a sixth step of assigning processors to each merge processing;

a seventh step of performing merge processing by the assigned processors and outputting the sorted partial data strings in descending order; and a step of repeating the fourth step to the seventh step using the merge-processed data strings as the partial data strings until the number of output data strings become one.

The first step to the third step, however, are necessary only when the input data string is unsorted. The repeat of the fourth step to the seventh step ends in the stage when the merge-processed sorted partial data strings are merged into one data string. If two sorted data strings are provided, the fourth step to the seventh step are executed only once, and a repeat is not required.

The program according to the present invention is recorded on a recording medium, for example.

The media includes, for example, an EPROM device, flash memory device, flexible disk, hard disk, magnetic tape, magneto-optical disk, CD (including C-ROM, Video-CD), DVD (including DVD-video, DVD-ROM and DVD-RAM), ROM cartridge, RAM memory cartridge with backup battery, flash memory cartridge and non-volatile RAM cartridge.

Cable communication media, such as telephone lines, and radio communication media such as microwave lines, are also included. The Internet is included in the communication media referred to herein.

A medium is something where information (primarily digital data and programs) is recorded by a physical means, and can have a processing device, such as a computer and dedicated processor, execute predetermined functions. In other words, a medium can be anything that can receive a downloaded program using a computer by some means, and have the computer execute predetermined functions.

BRIEF DESCRIPTION OF THE DRAWINGS

FIG. 9 is a flow chart depicting the area division according to the embodiment (merging in ascending order);

BEST MODE FOR CARRYING OUT THE INVENTION

Embodiment 1

The device/method according to an embodiment of the present invention will be described with reference to the drawings.

Figure 1:
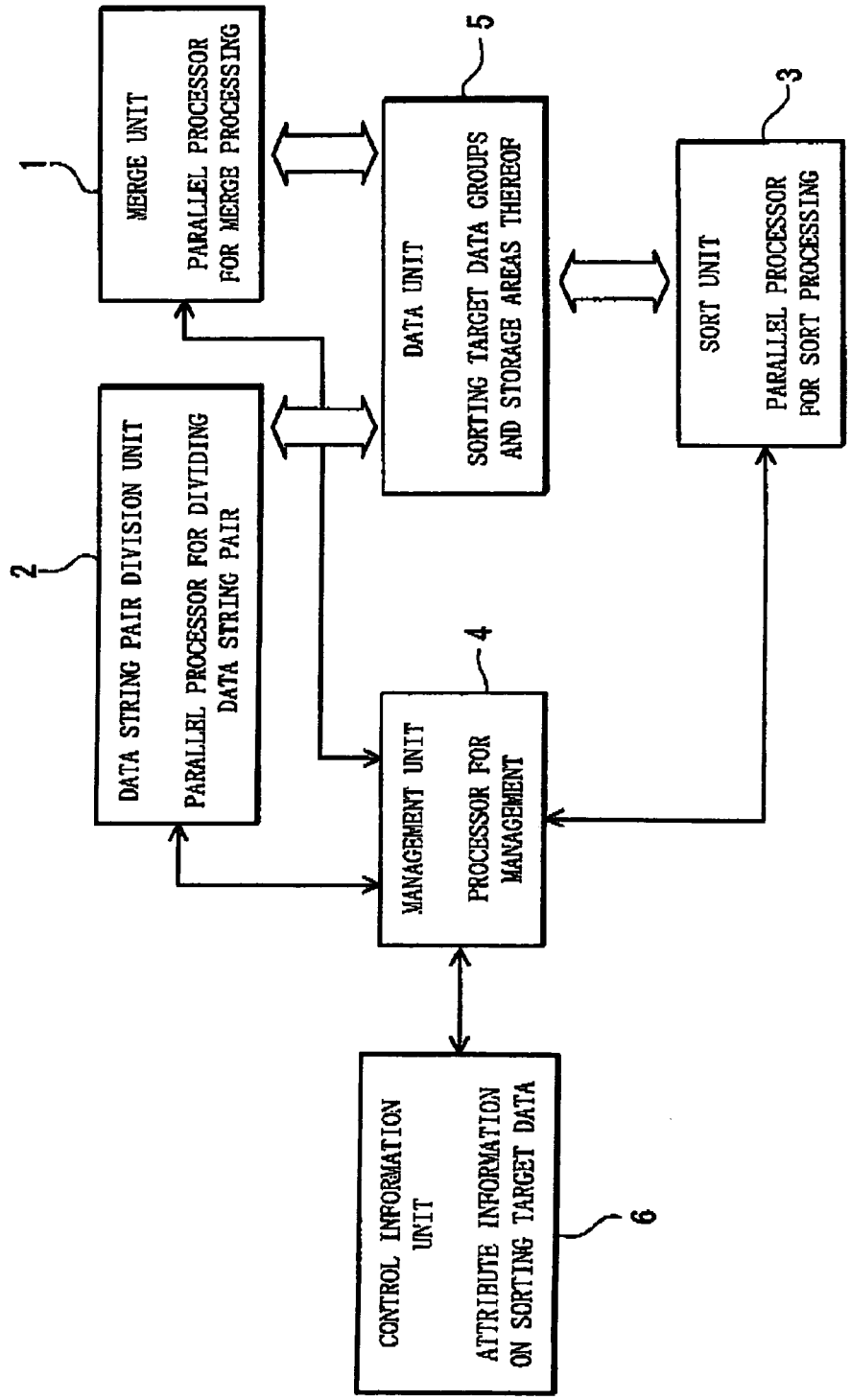
FIG. 1 is a diagram depicting an overview of the parallel merge/sort processing device according to the present invention.

FIG. 1 shows a general configuration of this device. 1 is a parallel processor for merge processing that includes a plurality of processors and can execute a plurality of tasks simultaneously in parallel. 2 is a parallel processor for area division that divides two sets of sorted data storing pairs into a predetermined number of partial data string pairs and returns them to the processor for management 4. 3 is a parallel processor for sort processing that sorts unsorted data strings existing in a specified area. 4 is a management processor which is in-charge of general control, and receives such information 6 as a location of input data and the number of data, which is received from the outside at the start of the job, and performs such processing as editing information required for tasks to be executed by the parallel processor group to execute, starting the tasks and accepting task end reports. 5 is a data storage area which includes the sorting target data.

A same parallel processor may be used for 1 and 3, which is the same for the parallel processor 2, for dividing a data string pair.

Parallelism is improved by dividing two sorted data string pairs, which are handled only for one merge processing in conventional technology, into a plurality of partial data string pairs. In the case of the later mentioned example in FIG. 3, a pair of data strings D21 and D22 to be input for merging are divided into two, so as to acquire two sets of input data string pairs, which can be simultaneously merged in descending order and merged in ascending order respectively by the processors P1-P4, and the pair of data strings D31 and D32 is divided into four to acquire four sets of input data string pairs, which can be simultaneously merged in descending order and merged in ascending order respectively by the processors P1-P8. This will be described in detail later.

Figure 2:
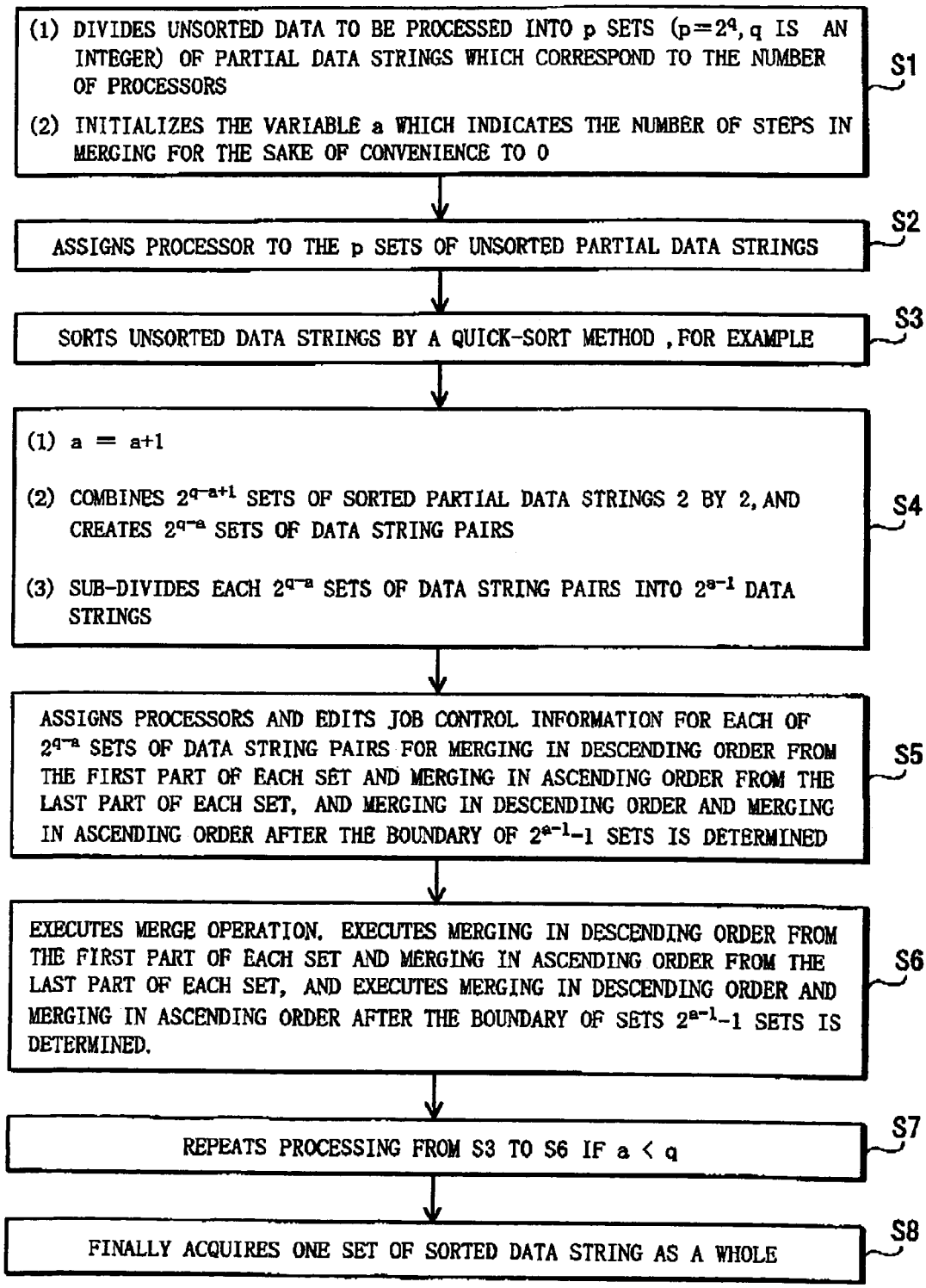
FIG. 2 is a flow chart depicting the processing according to Embodiment 1.

In the case of the parallel two-branch merge/sort method shown in the flow chart in FIG. 2, the sorting target data string is divided into p sets of unsorted data strings which have a relationship $p=2^q$, and each data string is independently sorted by a quick-sort method, for example.

S1-S3 are procedures for dividing the input data string into a plurality of data strings, and having P number of processors execute sort processing simultaneously in parallel. Then q steps of merge/sort are repeated, and finally one set of sorted data strings is acquired as a whole.

S1: Divides the unsorted data string to be sorted into p sets of unsorted data strings. Here $p=2^q$, which is the number of available processors, and q indicates the number of steps of merging. p is increased if a short processing time is desired, but in this case, q also increases because of the relationship of $\log_2 p$. The variable a, to indicate the merging step to be used, is initialized to 0 for convenience of explanation.

S2: Assigns the p number of processors to the divided p segments.

S3: Sorts the data strings independently.

S4: Divides the sorted partial data string pairs to be input for the merge operation.

(1) a=a+1

(2) $2^{q-a}$ sets of input data string pairs are created by combining $2^{q-a+1}$ sets of sorted partial data strings two by two.

Each respective input data string pair is divided into $2^{a-1}$ sets of sub-divided data string pairs. The method for dividing a data string pair will be described later.

S5: Assigns processors for merging in descending order and for merging in ascending order to each of $(2^{q-a}) \times (2^{a-1}) = 2^{q-1}$ sets of sub-divided data string pairs.

S6: Simultaneously executes merging in descending order and merging in ascending order to each set using two processors respectively, and acquires $2^{q-a}$ sets of sorted partial data strings.

S7: Adds 1 to a if a≠q, and repeats the processing in S4-S7.

S8: By the above procedure, one set of sorted data strings can be finally acquired as a whole.

In the method in FIG. 2, division is not performed in the first step, but two-division is performed for the area in the second step, four-division in the third step, eight-division in the fourth step, and $2^{q-1}$ division in the q-th step, and merging in descending order and merging in ascending order are applied to each area. In the case of the parallel two-branching merge/sort method, where the sorted data string division method in FIG. 2 is applied, a merge operation at parallelism p can always be performed.

Figure 3:
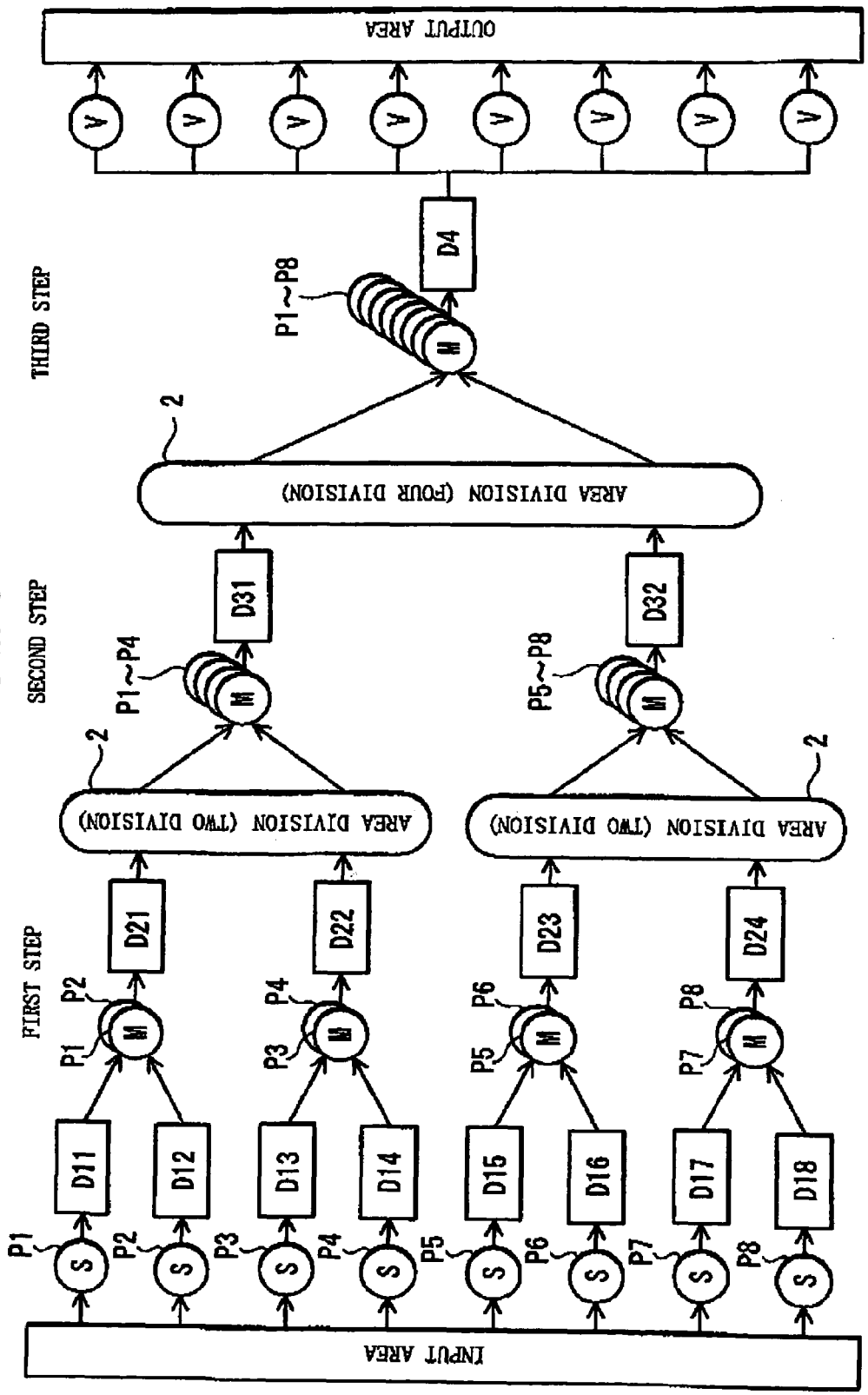
FIG. 3 is a diagram depicting the entire processing according to the embodiment.

The processing of the parallel two-branching merge/sort method when the number of processors is eight will be described with reference to FIG. 3. In FIG. 3, a circle indicates a processor, and a square indicates a data string or an area in which the data string (D) is stored. The symbol in the circle shows the content of the processing to be executed by the processor, where S indicates sort processing, M indicates merge processing, and V indicates transfer processing.

The data in the input area is divided into eight sets of unsorted data strings. The eight processors P1-P8 executes sort processing on these partial data strings simultaneously in parallel. The processing results are stored in the areas D11-D18.

Then the merging/sorting in the first step is performed. The data strings D11 and D12 are merged by the processors P1 and P2 and stored in D21, the data strings D13 and D14 are merged by the processors P3 and P4 and stored in D22, the data strings D15 and D16 are merged by the processors P5 and P6 and stored in D23, and the data strings D17 and D18 are merged by the processors P7 and P8 and stored in D24.

In the first step, merging in descending order and merging in ascending order are performed simultaneously, so eight processors are used even if division is not executed. (The assignment of processors here is for the sake of convenience. This is the same herein below.)

Then the merging/sorting in the second step is performed. The data string pairs are divided into two to use all the processors. In other words, the partial data string pair D21 and D22 is divided into two while considering the magnitude of the key value, and a pair D21-1 and D22-1 and a pair D21-2 and D22-2 are created. This is the same for the data string pair D23 and D24.

And the data strings D21-1 and D22-1 are merged by the processors P1 and P2 and stored in one side of D31 (the side of which the key value is greater), and the data strings D21-2 and D22-2 are merged by the processors P3 and P4 and stored in the other side of D31 (the side of which the key value is smaller). In the same way, the data strings D23 and D24 are merged by the processors P5-P8 and stored in D32.

Then the merging/sorting in the third step is performed. Division is executed in the same way as the second step. In other words, the data strings D31 and D32 are paired, which are divided into four while considering the magnitude of the key value, and the partial data string pairs D31-1 and D32-1, D31-2 and D32-2, D31-3 and D32-3, and D31-4 and D32-4 are created respectively. The data strings D31-1 and D32-1 are merged by the processors P1 and P2 and stored in a predetermined position in D4, the data strings D31-2 and D32-2 are merged by the processors P3 and P4 and stored in a predetermined position in the area D4, the data strings D31-3 and D32-3 are merged by the processors P5 and P6 and stored in a predetermined position in the area D4, and the data strings D31-4 and D32-4 are merged by the processors P7 and P8 and stored in a predetermined position in the area D4. By this, merging/sorting is completed. The acquired result D4 is transferred to the output area by the eight processors if necessary.

In each step of the processing in FIG. 3, all of the eight processors are used.

Figure 5:
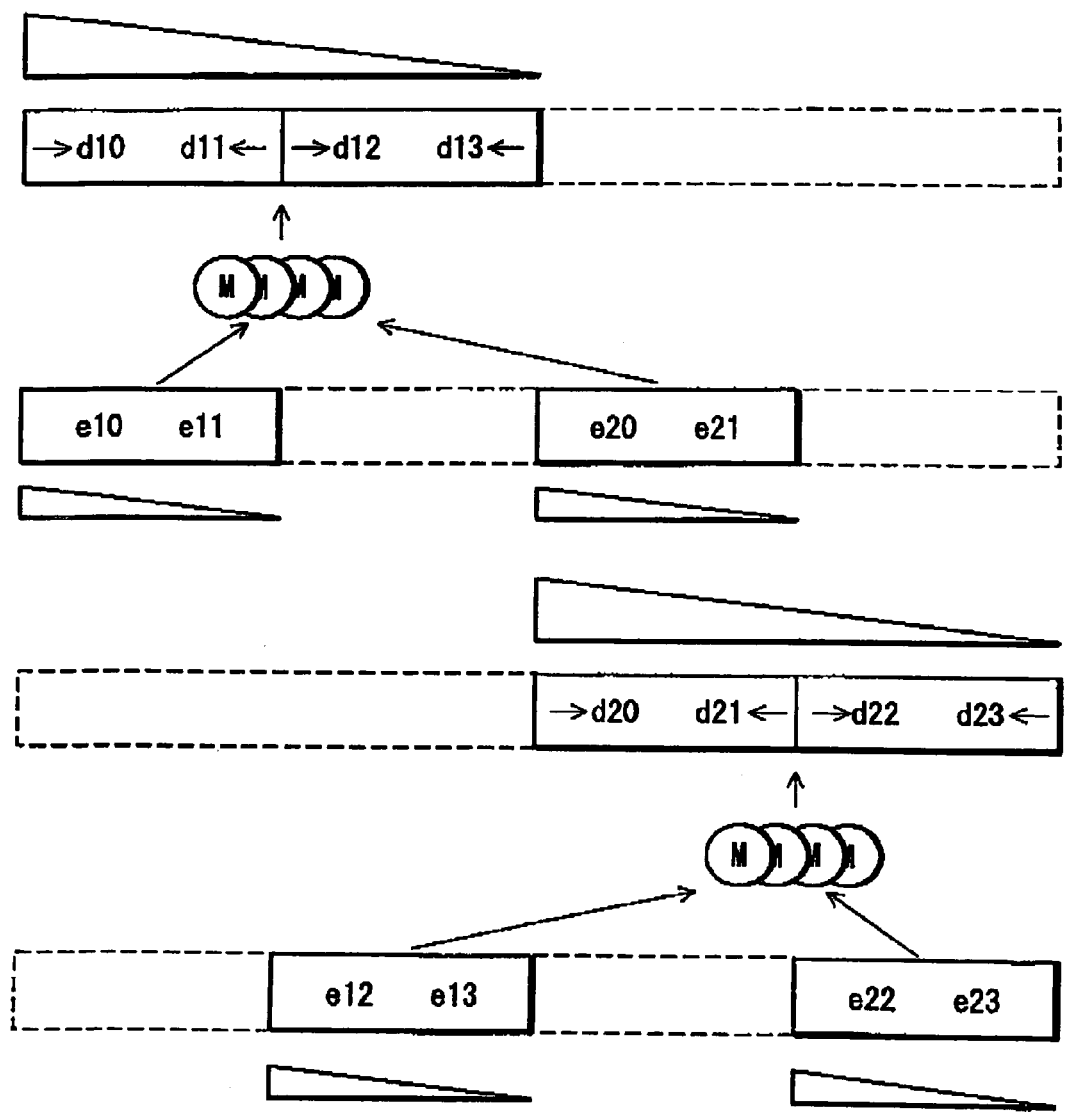
FIG. 5 is a diagram depicting the processing according to the embodiment.
Figure 6:
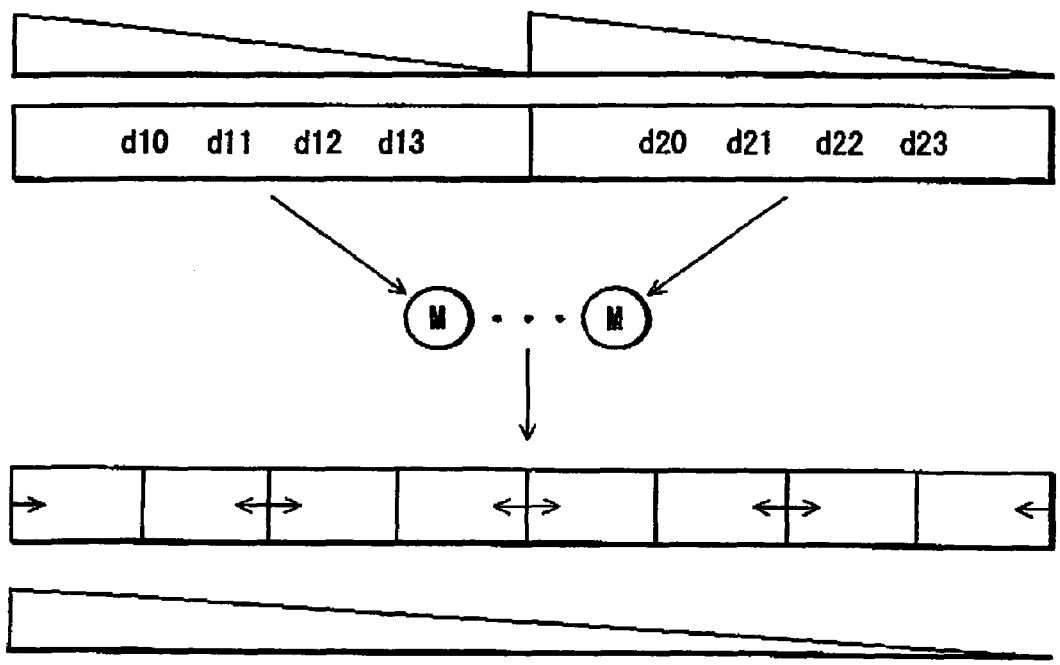
FIG. 6 is a diagram depicting the processing according to the embodiment.

The processing in FIG. 3 will be described with reference to FIG. 4 to FIG. 6.

The case of sorting a total of 3040 sets of data of eight partial data strings (number of data in each block=380) d10-d13 and d20-d23 will be described.

(1) d10-d23 are sorted using eight processors respectively. The mid-stage in FIG. 4 shows the sorted status where the key values are arranged in descending order. In FIG. 4, the triangle indicates the distribution of the magnitude of the key value in each block.

Figure 4:
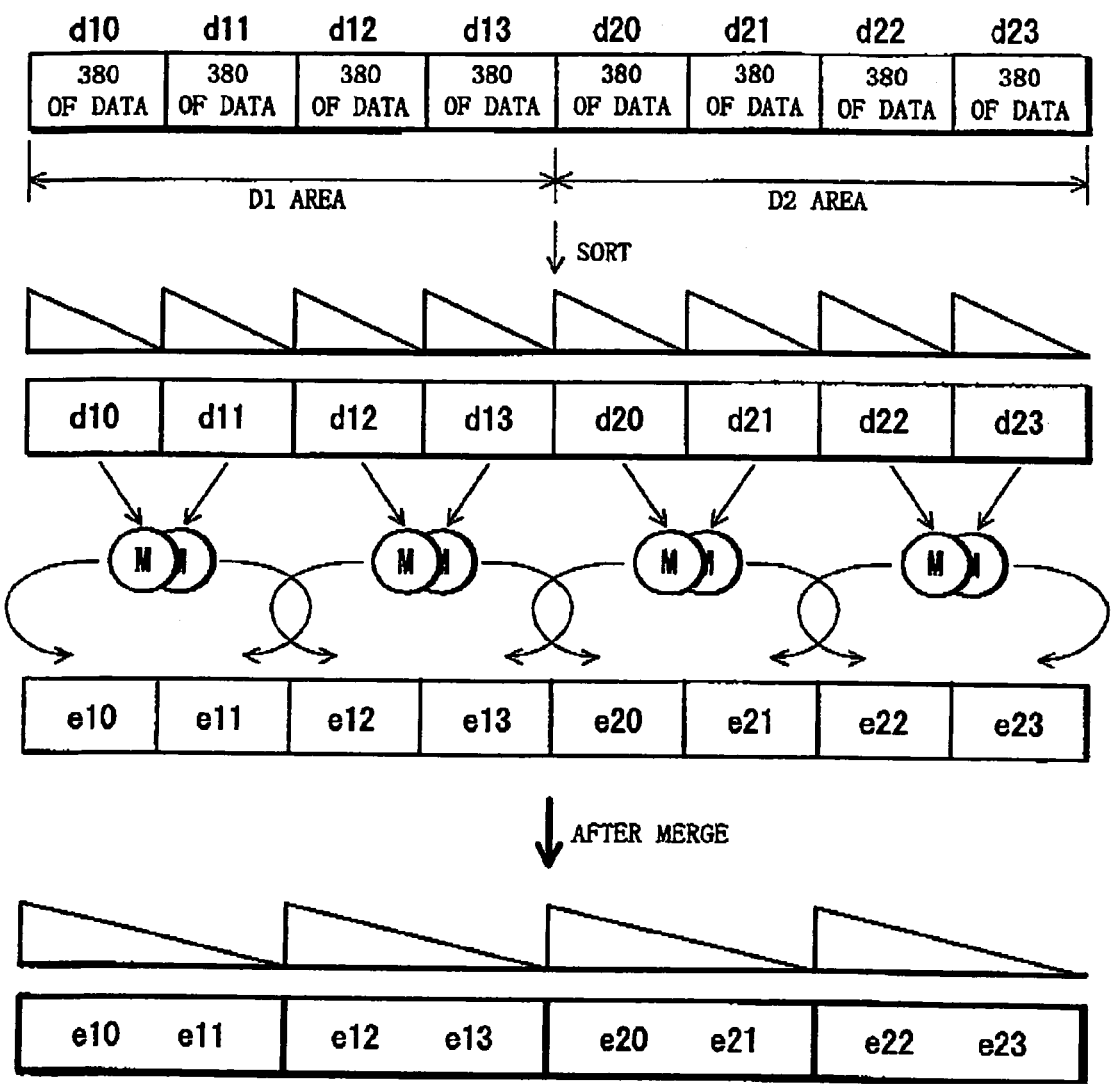
FIG. 4 is a diagram depicting the processing according to the embodiment.

(2) A set of work areas e10-e13 and e20-e23 are created separately, and parallel merging is executed as the mid-stage in FIG. 4 shows. Then the result shown in the last stage is acquired.

(3) The merging/sorting in the second step is performed. (e10, e11) and (e20, e21) are combined and divided into two while considering the magnitude of the key value, so as to create two sets of data string pairs for merge input, and four parallel merge operations are executed (first stage in FIG. 5). At the same time, (e12, e13) and (e22, e23) are combined and divided into two while considering the magnitude of the key value, so as to create two sets of data string pairs for merge input, and four parallel merge operations are executed (last stage in FIG. 5). As a result; two series of four parallel mergings are executed in parallel.

(4) The merging/sorting in the third step is performed. d10-d13 and d20-d23 are combined and divided into four while considering the magnitude of the key value, so as to create four sets of merge input pairs, which are output to e10-e23. Each area is divided into 4, and processing in descending order and processing in ascending order are executed in each area, so eight processings are executed in parallel.

Figure 7:
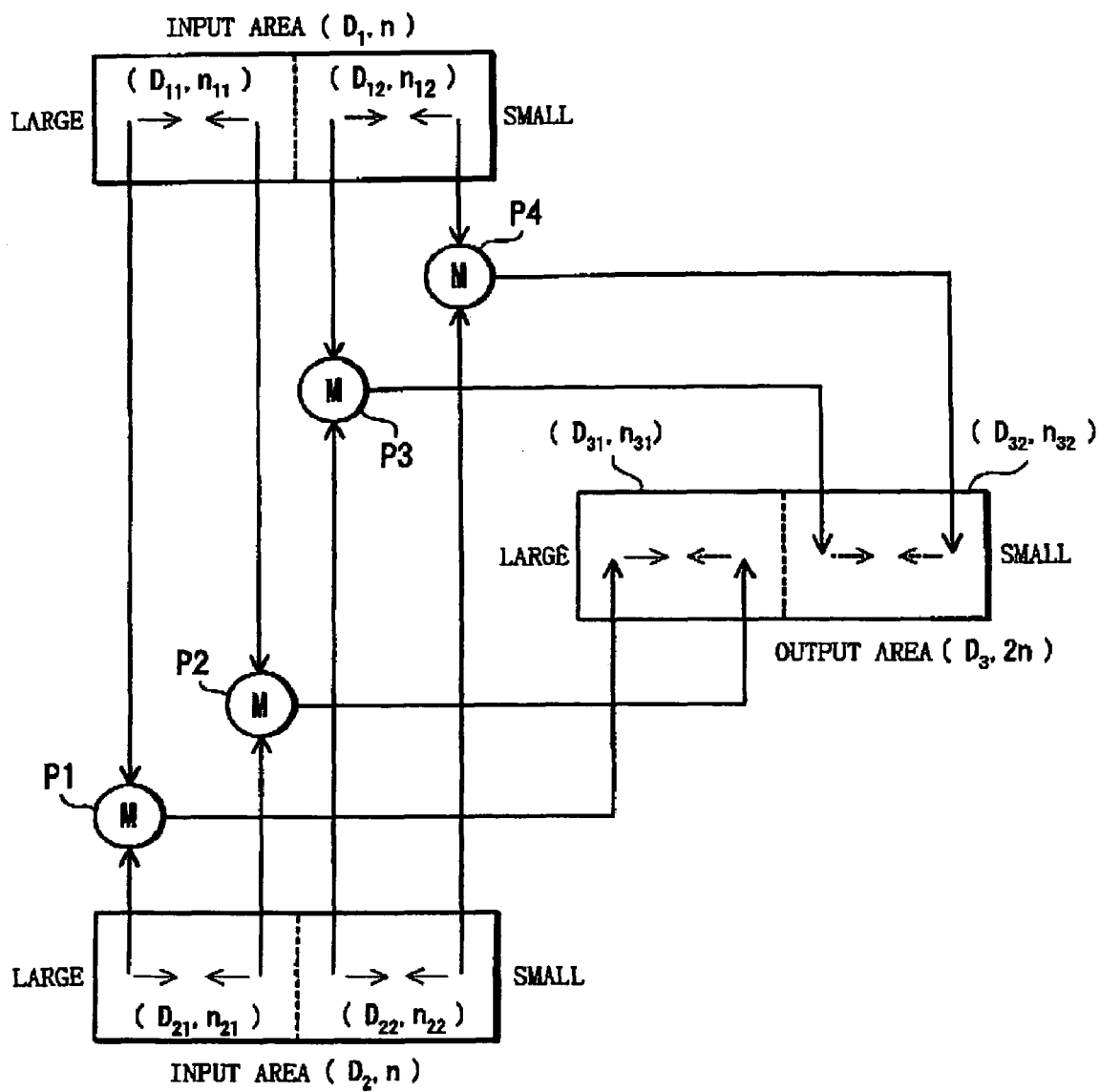
FIG. 7 is a diagram depicting a part of the processing according to the embodiment.

Now the merge/sort processing in each step in FIG. 3 will be described in detail. FIG. 7 is a diagram depicting this. It is assumed that the input data string pairs for the input area ($D_1$, n) and ($D_2$, n) are provided. Here ($D_1$, n) and ($D_2$, n) mean the data strings $D_1$ and $D_2$, which are comprised of n number of data respectively. In each area in FIG. 7, the data is sorted such that the key value is greater when approaching the left side and smaller when approaching the right side.

[Paragraph 0048]

It is assumed that the sorted partial data string pairs ($D_1$, n) and ($D_2$, n) are divided (two-division in the case of FIG. 7) into a pair ($D_{11}$, $n_{11}$) and ($D_{21}$, $n_{21}$) and into a pair ($D_{12}$, $n_{12}$) and ($D_{22}$, $n_{22}$) by the data string pair division unit 2, shown in FIG. 1, while considering the magnitude of the key value by the data string pair division unit shown in FIG. 1. This division must satisfy the following formula.

The smaller one of the key value of the data in the last part of $D_{11}$ and the key value of the data in the last part of $D_{21}$≧greater one of the key value of the data in the first part of $D_{12}$ and the key value of the data in the first part of $D_{22}$.

$$n_{11}+n_{21}=2x, n_{12}+n_{22}=2(n-x)$$

Here 2x is a number of data comprising the data string pair {($D_{11}$, $n_{11}$), ($D_{21}$, $n_{21}$)}.

The processor P1 performs merging in descending order and the processor P2 performs merging in ascending order for the data string pair ($D_{11}$, $n_{11}$) and ($D_{21}$ $n_{21}$), which is input for the merge operation.

The dotted line in FIG. 7 shows the sequence of merging. The result is sequentially output to ($D_{31}$, $n_{31}$), which is a part of the output area ($D_3$, 2n).

In the same way, the processor P3 performs merging in descending order and the processor P4 performs merging in ascending order for the sorted data string pair ($D_{12}$, $n_{12}$) and ($D_{22}$, $n_{22}$). The result is sequentially output to ($D_{32}$, $n_{32}$), which is a part of the output area ($D_3$, 2n).

Here (the key value of the data in the last part of $D_{31}$)≧(the key value of the data in the first part of $D_{32}$).

$$n_{31}+n_{32}=2n$$

By dividing the input data string pairs as above and assigning processors to the divided data string pairs respectively, simultaneous parallel processing by a plurality of processors becomes possible. The above description is just an example, and the present invention is not limited to this.

Now a procedure to divide the sorted data string pairs will be described. As the example in FIG. 7 clearly shows, (the key value of the data in the last part of $D_{31}$)≧(the key value of the data in the first part of $D_{32}$) must be established for merging/sorting to be correctly performed. $D_{31}$ is the merging/sorting result of $D_{11}$ and $D_{21}$, and $D_{32}$ is the merging/sorting result of $D_{12}$ and $D_{22}$. Therefore (the minimum value of the key values of the data included in $D_{11}$ or $D_{21}$)≧(the maximum value of the key values of the data included in $D_{12}$ or $D_{22}$). This means that the condition of the area division of the present invention is as follows.

In the division condition, when a pair of two pre-sorted data strings ($D_1$, n) and ($D_2$, n) is divided into two partial data string pairs, a pair ($D_{11}$, $n_{11}$) and ($D_{21}$, $n_{21}$) and a pair ($D_{12}$, $n_{12}$) and ($D_{22}$, $n_{22}$), (the smaller one of the key values of the data in the last part of the partial data string $D_{11}$ and that of the partial data string $D_{21}$)≧(the greater value of the key values of the data in the first part of the partial data string $D_{12}$ and that of the partial data string $D_{22}$) must be established, and also $n_{11}+n_{22}=2x$ and $n_{12}+n_{22}=2n-2x$ must be established. Here x is a half number of the number of data of the data string pairs when counted from the first part of $D_1$ and $D_2$.

For example, if two division operations, x=300 and x=600, are performed for 1000 sorted data string pairs, these data string pairs are divided into three data string pairs, that is {($D_{11}$, $n_{11}$), ($D_{21}$, $n_{21}$)}, {($D_{12}$, $n_{12}$), ($D_{22}$, $n_{22}$)}, and {($D_{13}$, $n_{13}$), ($D_{23}$, $n_{23}$)}, of which the total number of data in each data string pair is 600, 600 and 800 respectively. In this case, the above-mentioned magnitude relationship must be satisfied between the key value of the 600$^{th}$ data from the beginning when both data strings are combined (the smaller one of the key values of the data in the last part of $D_{11}$ and $D_{21}$), and the key value of the 601th data (the greater one of the key values of the data in the first part of $D_{12}$ and $D_{22}$), and between the key value of the 1200$^{th}$ data and the key value of the 1201$^{st}$ data.

Now a sorted data string pair division method that satisfies the above condition will be described. Division of the data string pairs that satisfies the above condition can be implemented by the following division method for merging in descending order or by a division method for merging in ascending order, or by using both of these methods.

Before describing a specific procedure of the sorted data string pair division method, a prerequisite thereof will be described. Two sorted data strings, $D_1$ and $D_2$, each of which is comprised of n number of data, are assumed, and both of the data strings are equally divided into k sets of data string pairs that include (n/k) sets of data.

An individual data string is specified by a data string number, 0 to k−1. The position of each data is specified by an index value which increases 1 for each data with the first part of the data string 0. This position specification method is used not only for the data position specification of the entire D1 and D2, but also for the position specification in each divided data string. The start edge or the termination edge data position is specified by the expression "the first part" or "the last part" of the data string.

In the above-mentioned partial data strings $D_1$ and $D_2$ after equal division, the data strings with a same data string number are assumed as the temporary merging target data string pair.

In other words, the start point of merging in descending order, targeting the data string pair with the data string number i (i=0–k–1), is assumed to be the start edge of the remaining data string when (n/k) (i) sets of data is removed from the start edge of $D_1$ and $D_2$, that is the point at which the index value is (n/k) (i).

The start point of merging in ascending order, targeting the data string with the data string number i (i=0–k–1), is assumed to be the last part of the data string where (n/k)(i+1) sets of data exist respectively from the start edge of $D_1$ and $D_2$, that is the point at which the index value is (n/k) (i+1)–1.

The distribution of the key values in $D_1$ and in $D_2$ are independent from each other. Therefore even if data has been sorted in each data string, the sorted result, without any inconsistency in the distribution of the key values as a whole, cannot be acquired by simply performing a merge operation from the temporary start point. So the start point (division point) that satisfies the above condition will be determined by the following procedure.

<In the Case of Merging in Descending Order>

There are two data strings, $D_1$ and $D_2$, each of which consists of sorted n number of data. A data string pair which satisfies the condition of paragraph 0048 and the number of data from the first part of the data string is 2(n/k)+2, 4(n/k)+2, 6(n/k)+2, . . . 2(k–1)(n/k)+2, and is determined with considering the magnitude of the key value from the first part of both data strings. This boundary is the index of the first part of the remaining data string pair when the data string pair, of which the number of data is 2(n/k), 4(n/k), 6(n/k) . . . 2(k–1)(n/k), is removed.

Figure 8:
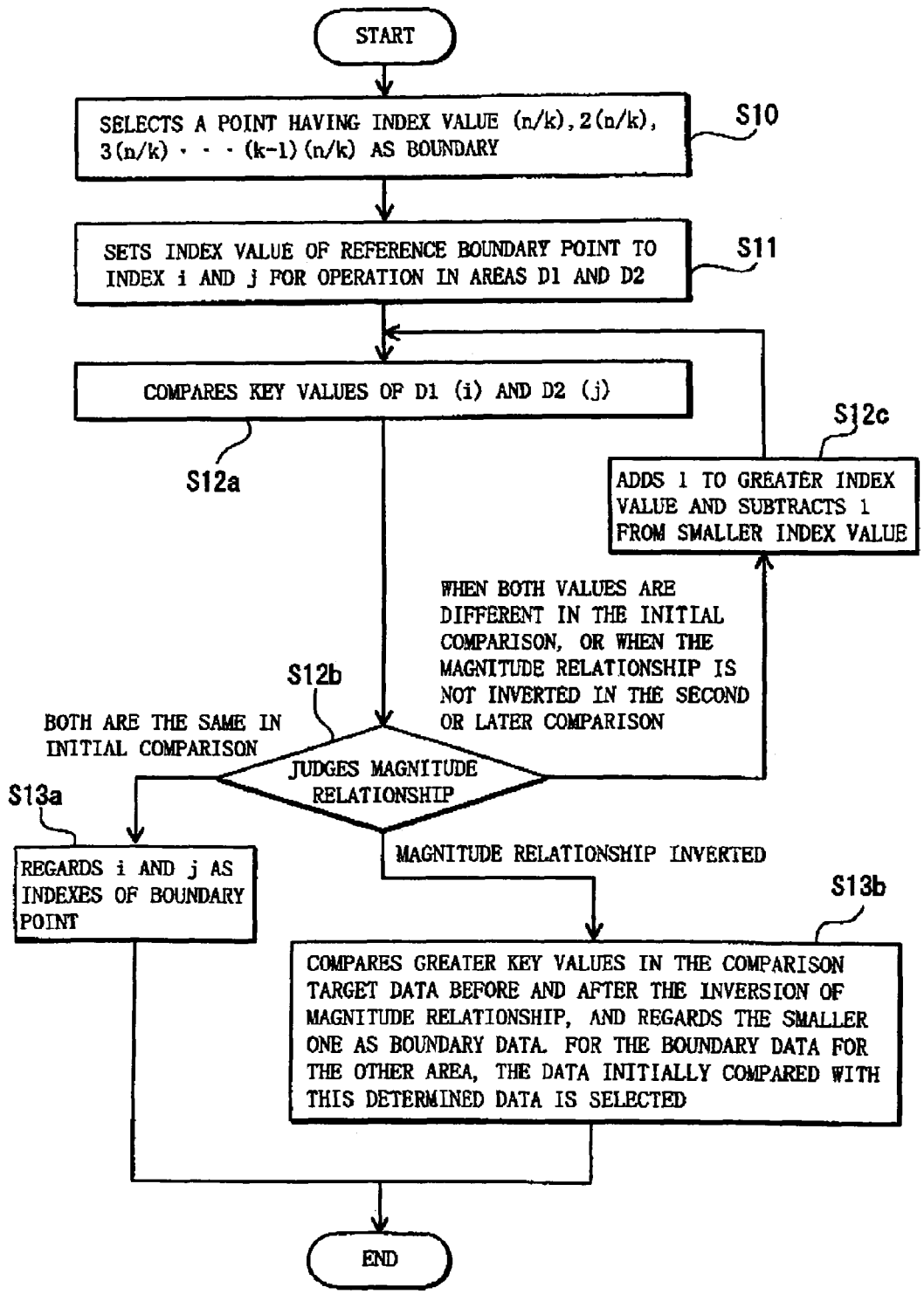
FIG. 8 is a flow chart depicting the area division according to the embodiment (merging in descending order)

The following refers to FIG. 8.

S10: As the boundary initial Value (or temporary boundary value), a point with index value (n/k), 2(n/k), 3(n/k), . . . (k–1)(n/k), is selected.

S11: Sets the index value of the boundary initial value determined in S10 for the index variables for operation i and j in the $D_1$ and $D_2$ areas.

S12: Repeats the following procedure until the magnitude relationship is inverted. Including the initial comparison, the case when the key values are the same is also regarded as an inversion.

S12*a*: Compares the key values of $D_1(i)$ and $D_2(j)$.

S12*b*: Judges the magnitude relationship.

(1) Branches to S13*a* if both key values are the same in the initial comparison.

(2) Branches to S13*b* if the magnitude relationship is inverted.

(3) If both key values are not the same in the initial comparison, or if the magnitude relationship is not inverted in the second or later comparison, 1 is added to the index value with the greater key value, 1 is subtracted from the index value with the smaller key value, then processing branches to S12 (S12*c*).

S13*a*: i and j are regarded as the indexes of the boundary point, and processing ends.

S13*b*: Among comparison target data, data with a greater key value is compared immediately before and immediately after the change of the magnitude relationship, and the data with the smaller key value is regarded as boundary data. For the boundary data of the other area, data initially compared with this determined data is selected.

<In the Case of Merging in Ascending Order>

There are two data strings, $D_1$ and $D_2$, each of which contains n number of data. The last part of the data string which satisfies the condition of paragraph 0048 and the number of data from the first part of the data string is 2(n/k), 4(n/k), 6(n/k), . . . 2(k–1)(n/k) is determined with considering the magnitude distribution of the key values of both data strings. Hereafter the following refers to FIG. 9.

S20: As a boundary initial value (or a temporary boundary value) a point with index value (n/k)–1, 2(n/k)–1, 3(n/k)–1, . . . (k–1)(n/k)–1 is selected.

S21: Sets the index value of the boundary initial value determined in S20 for the index variables for operation i and j in the $D_1$ and $D_2$ areas.

S22: Repeats the following procedure until the magnitude relationship is inverted. Including the initial comparison, the case when the key values are the same is also regarded as an inversion.

S22*a*: Compares the key values of $D_1$ (i) and $D_2$ (j).

S22*b*: Judges the magnitude relationship.

(1) Branches to S23*a* if both key values are the same in the initial comparison.

(2) Branches to S23*b* if the magnitude relationship is inverted.

(3) If both key values are not the same in the initial comparison, or if the magnitude relationship is not inverted in the second or later comparison, 1 is added to the index value with the greater key value, 1 is subtracted from the index value with the smaller key value, then processing branches to S22.

S23*a*: Regards i and j as the indexes of the boundary point, and processing ends.

S23*b*: Among comparison target data, data with a smaller key value is compared immediately before and immediately after the change of the magnitude relationship, and the data with the greater key value is regarded as boundary data. For the boundary data of the other area, data initially compared with this determined data is selected.

An example of dividing the data string pairs according to the above procedure will be described.

Figure 10A:
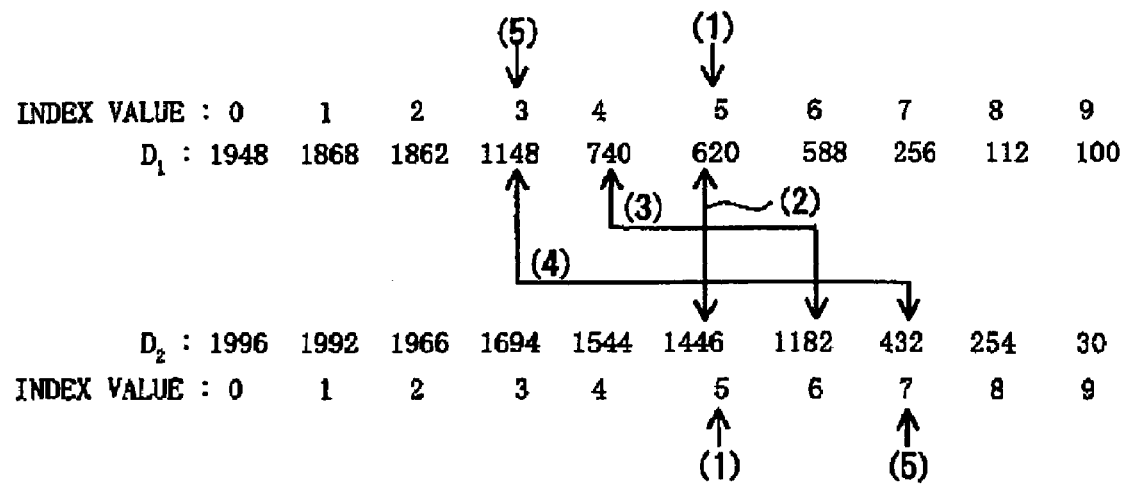
FIG. 10 is a diagram depicting area division according to the embodiment.
Figure 10B:
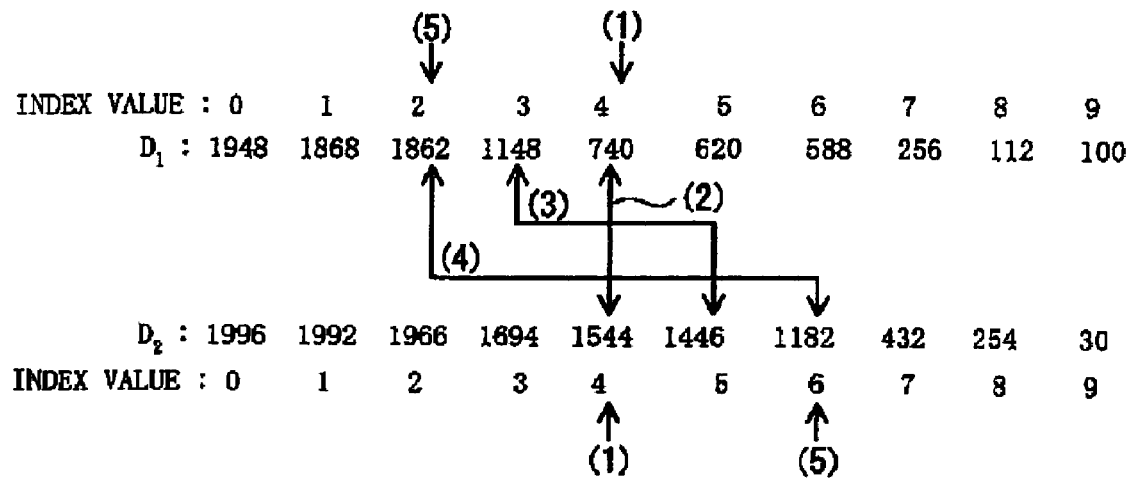
Figure 10C:
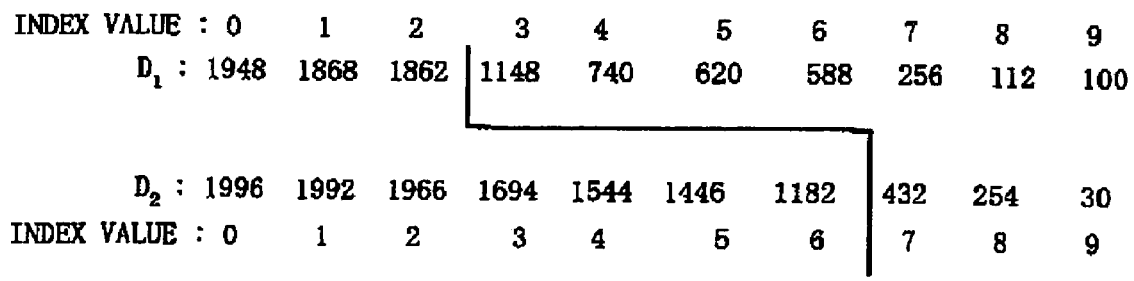

FIG. 10 shows two data strings, including 10 numeric values respectively, which are sorted in descending order. FIG. 10(*a*) is a diagram depicting the procedure to determine the start point of merging in descending order, FIG. 10(*b*) is a diagram depicting the procedure to determine the start point of merging in ascending order, and FIG. 10(*c*) shows the result of area division.

D1: (1948, 1868, 1862, 1148, 740, 620, 588, 256, 112, 100)

D2: (1996, 1992, 1966, 1694, 1544, 1448, 1182, 432, 254, 30)

[Paragraph 0059]

<Deciding Start Point of Merging in Descending Order>

(1) The first part of a data string, when five sets of data are excluded from the first part of the data string, becomes a temporal division point. This value is set for the indexes for operation i and j. It is assumed that i=j=5.

(2) $D_1$ (i=5)=620 and $D_2$ (j=5)=1466 are compared. Since 1466 is the greater, i becomes i–1=4 and j becomes j+1=6.

(3) $D_1$ (i=4)=740 and $D_2$ (j=6)=1182 are compared. Since 1182 is the greater, i becomes i–1=3 and j becomes j+1=7.

(4) $D_1$ (I=3)=1148 and $D_2$ (j=7)=432 are compared. Since 1148 is the greater, the inversion of the magnitude relationship is recognized here.

(1) The greater value in each comparison before and after the inversion, that is, 1148 and 1182, are compared, and the point of the smaller one thereof, that is 1148, is regarded as a boundary. The other boundary is the data initially compared with 1148, that is 432. If one boundary is known, the other boundary index value may be determined using the following formula (1), that is 2×5−3=7.

Index value of the other start point=index of temporary merging start point×2−index of the known start point <Deciding Start Point of Merging in Ascending Order>

(1) The point where five sets of data exist, from the first part of the data string, becomes a temporal dividing point. This value is set for the indexes for operation i and j. It is assumed that i=j=4.

(2) $D_1$ (i=4)=740 and $D_2$ (j=4)=1544 are compared, and since 1544 is the greater, i becomes i−1=3 and j becomes j+1=5.

(3) $D_1$ (i=3)=1148 and $D_2$ (j=5)=1446 are compared, and since 1446 is the greater, i becomes i−1=2 and j becomes j+1=6.

(4) $D_1$ (i=2)=1862 and $D_2$ (j=6)=1182 are compared, and since 1862 is the greater, the inversion of the magnitude relationship is recognized here.

(5) The smaller value in each comparison before and after the inversion, that is 1148 and 1182, are compared, and the point of the greater one thereof, that is 1182, is regarded as a boundary. The other boundary is the data initially compared with 1182, that is 1862. The index value of the other boundary may be determined using the formula in paragraph 0059, that is 2×4−6=2.

Figure 11A:
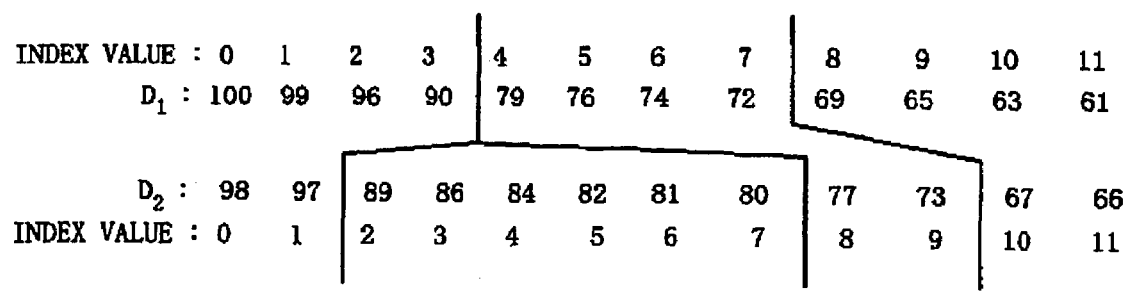
FIG. 11 is a diagram depicting an example of area division according to the embodiment.
Figure 11B:
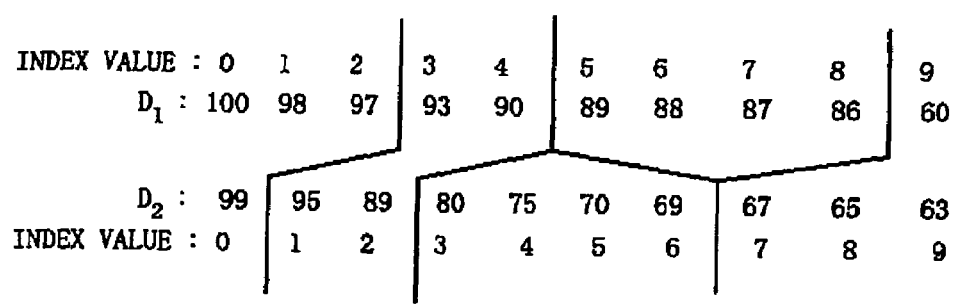

FIG. 11(a) and (b) show another example. FIG. 11(a) is a case when n=12, k=4 and n/k=3. FIG. 11(b) is a case when n=10, k=5 and n/k=2. As for this example, the above condition can be satisfied even if the output data, when potential data strings after division are merged, exists only in one of $D_1$ and $D_2$ (do not extend over both data strings).

In the device/method according to the embodiment of the present invention, the number of divided segments can be arbitrarily determined according to the number of available processing devices.

In the device/method according to the present invention, the effect is greater as the number of data is larger, since the ratio of the time required for dividing the sorted partial data string pair to be the input of merging/sorting into a plurality of data string pair, and the entire time is decreased. Among processing to divide the sorted partial data string pair to a plurality of data string pairs, if the processor assigned to the merge/sort operation executes the portion for determining substantial merging start point, then a more improved parallel processing becomes possible, and the ratio of the time required for area pair division to the entire processing time can be decreased.

(1) Case When the Effect is Large

When the distribution of the key values is almost the same for the data strings $D_1$ and $D_2$, the magnitude relationship inverts in a short time. Therefore it does not take very much time to decide a data boundary to be the merging input.

(2) Case When the Division Takes Time

The following cases are possible:

(a) Case When the Decision of a Division Pair Takes Time

When the segment number of the target data string pair is close to k/2 at dividing into k segments, and the magnitude relationship finally inverts at the first part or at the last part of $D_1$ or $D_2$, that is near the edge of the data string, the inversion of the magnitude relationship takes time. This occurs when the key distribution is different between $D_1$ and $D_2$, but it is rare that this occurs with frequency.

(b) Case When the Key Value Areas do not Overlap, and the Case When the Magnitude Relationship is not Inverted.

These are cases when comparison is continued seeking the inversion of the magnitude relationship, but inversion does not occur even if the front part of the end part of the area is reached. These cases can be handled as follows. If inversion does not occur even if the front part of the area is reached, inversion is forced by assuming an infinity key outside the front part, and if inversion does not occur even if the end part of the area is reached, inversion is caused by assuming an infinitesimal key outside the last part.

In the above example, the number of data of the data string $D_1$ and that of $D_2$ are assumed to be the same. The present invention is not limited to this. The present invention can be applied also to the case when the number of data is different between $D_1$ and $D_2$, only if the number of data is specified in the sort task or merge task.

The present invention is a general purpose technology, and which is particularly suitable for general purpose parallel processor type computers sharing a main storage. However, the present invention will be able to be applied regardless the configuration and processing format of the system only if the sorting target data group can be commonly accessed. The present invention will be implemented as a part of programs integrated into the software (OS) of a parallel processor type computer.

Embodiment 2

Figure 12:
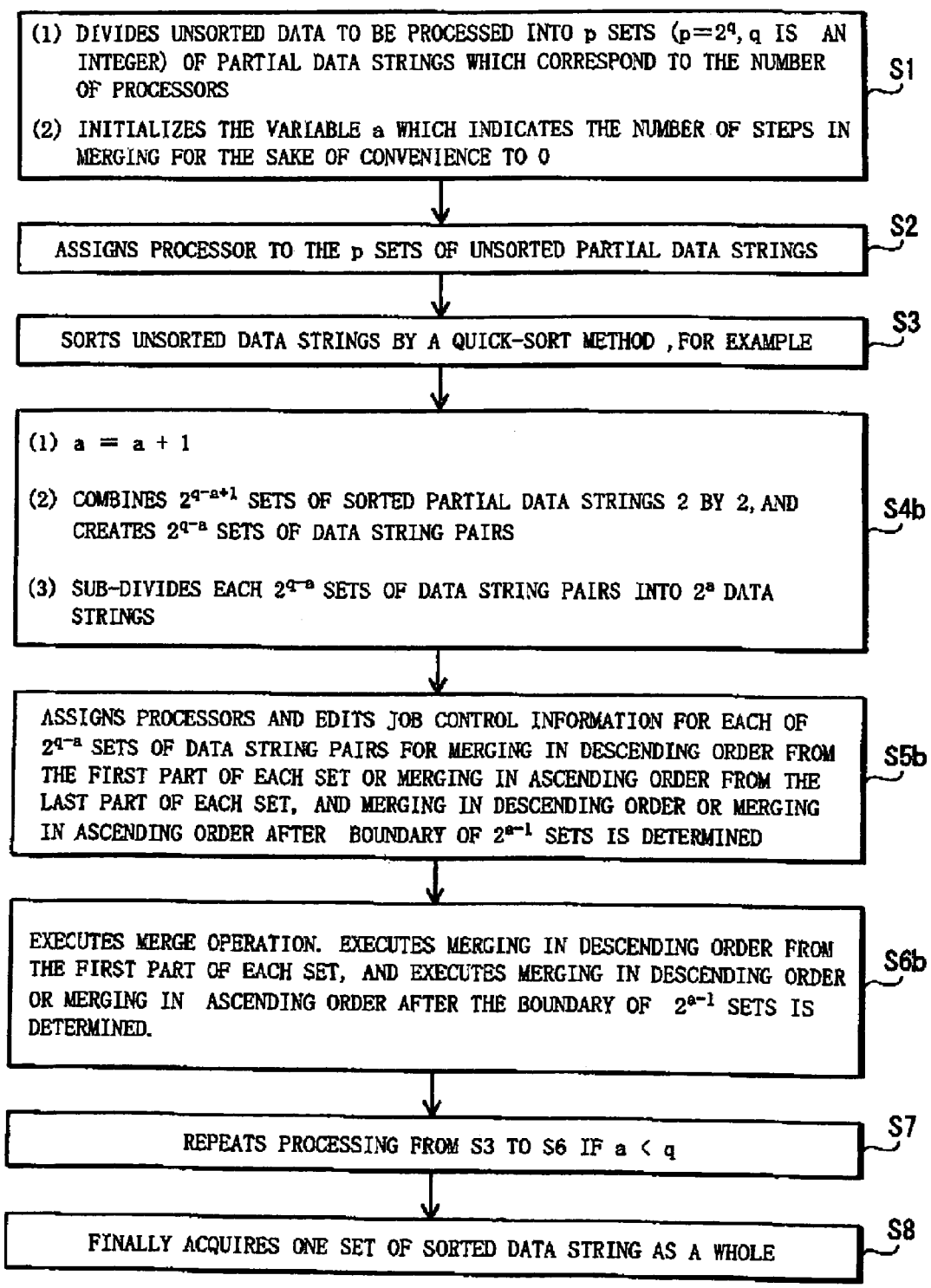
FIG. 12 is a flow chart depicting the processing according to Embodiment 2.
Figure 13:
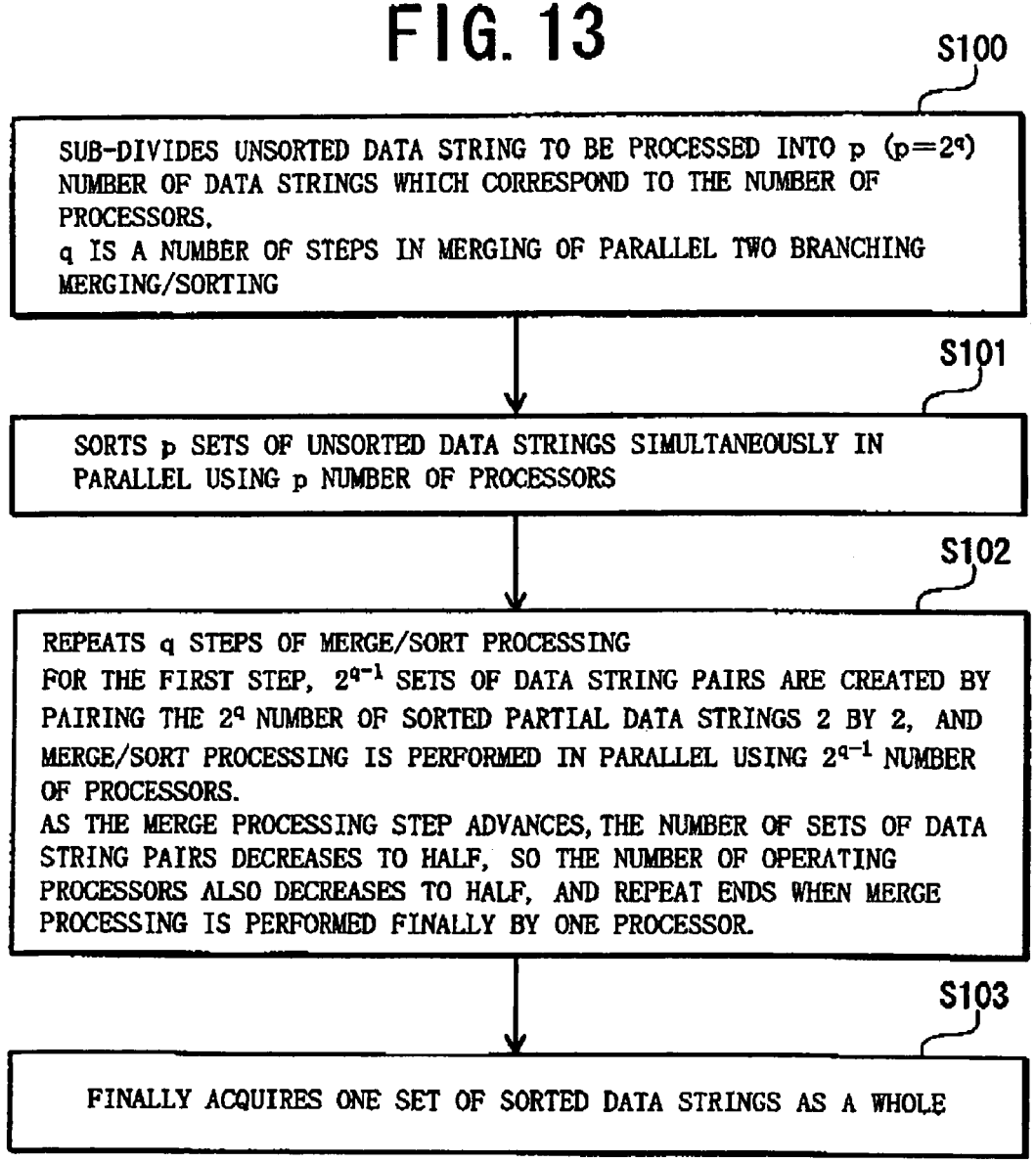
FIG. 13 is a flow chart depicting a conventional parallel merge/sort processing.
Figure 14:
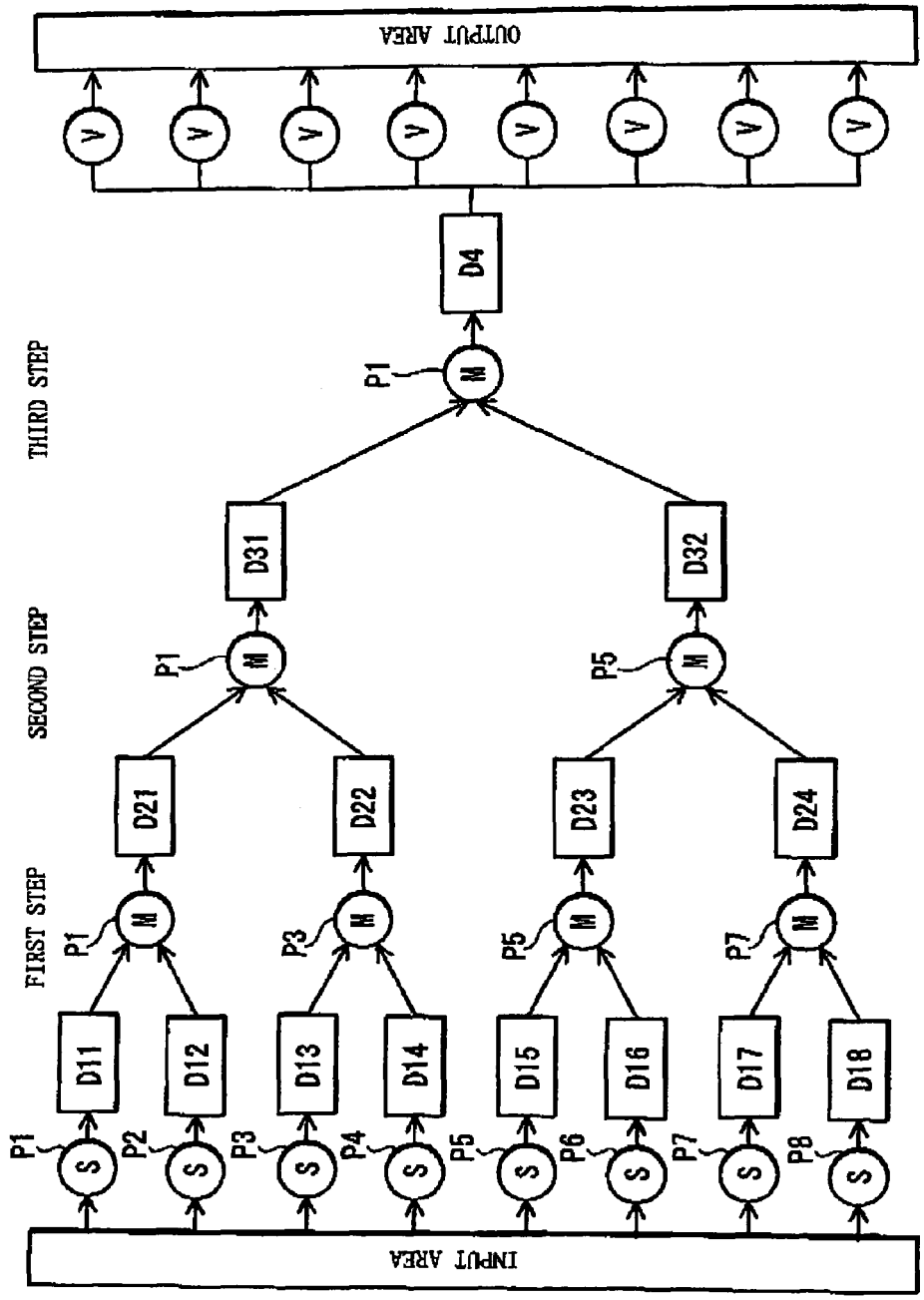
FIG. 14 is a diagram depicting conventional merge/sort processing.

The device/method of Embodiment 1 uses merging in descending order and merging in ascending order simultaneously, as shown in FIG. 2. The present invention, however, can also be applied to the case when only one of the merging in descending order and merging in ascending order is used. FIG. 12 is a flow chart when the present invention is applied to the parallel 2 branching merge/sort method. In this case, data is divided into two from the merging in the first step, so p number of processors always operate. The parallel processor to perform merge processing must have only one of the functions of merging in descending order or merging in ascending order, so implementation is easy.

The processing content of Embodiment 2 is the same as the case of Embodiment 1, so description thereof will be omitted. The difference in FIG. 12 from FIG. 2 is S4b, S5b and S6b.

The present invention is not limited to the above embodiments, but can be modified in various ways within the scope of the invention stated in the claims, which shall, needless to say, be included it the scope of the present invention.

In the present description, "means" does not always mean a physical means, but includes the case of when the function of each means is implemented by software. Also a function of one means may be implemented by two or more physical means, or two or more functions of means may be implemented by one physical means.

The invention claimed is:

1. A method for performing parallel sorting processing using a parallel processor, where (i) one unsorted data string, or (ii) two or more sorted partial data strings are received as an input, the method comprising:

if the input is one unsorted data string, a first step of dividing the unsorted data string to generate a plurality of unsorted partial data strings;

a second step of assigning a processor to said plurality of unsorted partial data strings respectively;

a third step of sorting each of said plurality of unsorted partial data strings independently by the assigned processor based on an arbitrary algorithm, to generate sorted partial data strings, the arbitrary algorithm sorting the plurality of unsorted partial data strings each in one of either ascending or descending order;

a fourth step of creating an input data string pair for sorting using two of the sorted partial data strings which were acquired in the third step or a seventh step or that were received as the input, and dividing the pair into sets of partial data string pairs respectively under a predetermined division condition;

a fifth step of editing control information relating to parallel processing of merge processing, the control information for parallel sorting of the plurality of divided partial data string pairs, the control information being information regarding at least the location of the plurality of divided partial data string pairs and the number of the plurality of divided partial data string pairs;

a sixth step of assigning to the plurality of divided partial data string pairs a processor group for merging of the plurality of divided partial data string pairs;

the seventh step of performing merge processing by the assigned processor and outputting sorted partial data strings; and a step of repeating said fourth step to said seventh step using the merge-processed sorted partial data strings as said sorted partial data strings, wherein the above steps are applied when one unsorted data string is provided, and the first to the third steps are unnecessary if two or more sorted data strings are provided, and a repeat of said fourth to seventh steps ends when the merge-processed sorted partial data strings are merged into one data string;

if only two sorted data strings are provided, the fourth to seventh steps are executed only once, and the repeat is not required, wherein the following items are satisfied as the predetermined division condition in said fourth step, when a condition where data string pair $(D_1, n)$ and $(D_2, n)$ are divided into two partial data string pairs $\{(D_{11}, n_{11}), (D_{21}, n_{21})\}$ and $\{(D_{12}, n_{12}), (D_{22}, n_{22})\}$, is established, and also $$n_{11}+n_{21}=2x, n_{12}+n_{22}=2(n-x)$$

is established, where x is a half value of the number of data of the partial data string pair $\{(D_{11}, n_{11}), (D_{21}, n_{21})\}$, and is also the number of data of $D_{11}$ and $D_{21}$ when $n_{11}=n_{21}$, and wherein said fourth step has the following functions:

(1) an operation to divide a sorted data string pair $\{(D_1, n), (D_2, n)\}$ into k sets of segment pairs, which is equivalent to performing $(k-1)$ sets of two-division operations in which a total of the number of data counted from a first part of $D_1$ and $D_2$ becomes 2x with changing a value of x, while considering a magnitude of the key values of both data strings; in this case, a sub-division problem of the sorted data string pair $\{(D_1, n), (D_2, n)\}$ to the k sets of segment pairs is replaced with the above-mentioned two-division problem of the data string that satisfies the items as the division condition in the fourth step;

(2) specifying a data position in the data string by an index value, the value sequentially increments with the index value of a first data in the data string $D_1$ or $D_2$ as 0, x indicates the number of data, but if the value of x itself is regarded as an index value, then [x] indicates the (x+1)th data counted as 1, 2, 3, . . . from the first part of the data string;

if $n_{11}=n_{21}$, then $n_{11}=n_{21}=x$, which is a formula indicating the number of data, can be interpreted that the position of the xth data counted from the first part, that is data with the index value x−1, is at a division boundary of $D_1$ and $D_2$;

(3) an area dividing function, comprising:

a step of setting said x as an initial value of a boundary index value for index variables i and j for specifying individual data in said data strings $D_1$ and $D_2$;

a comparison step of comparing a key value of data indicated by the index variable i of the data string $D_1$ and a key value of data indicated by the index variable j of the data string $D_2$;

a step of adding 1 to an index variable of the data with a greater key value, subtracting 1 from an index variable of the data with a smaller key value, then branching processing to said comparison step, if the key value of the data indicated by the index variable i of $D_1$ and the key value of the data indicated by the index variable j of $D_2$ are not the same in an initial comparison;

a step of adding 1 to the index variable of data with a greater key value, and subtracting 1 from the index variable of data with a smaller key value, then branching processing to said comparison step, if a magnitude relationship of the key value of data indicated by the index variable i of $D_1$ and the key value of data indicated by the index variable J of $D_2$ is unchanged in a second or later comparison;

a step of regarding the data indicated by the index variable i and the data indicated by the index variable j as a division boundary respectively, if the key value of the data indicated by the index variable i of $D_1$ and the key value of the data indicated by the index variable j of $D_2$ are the same in the initial comparison; and a step of comparing a greater one of the key value of $D_1$ and the key value of $D_2$ in a previous comparison operation with the greater one of the key value of $D_1$ and the key value of $D_2$ in a current comparison operation, and regarding the data with a smaller key value as the division boundary and regarding the data initially compared with this data as the other boundary, if the magnitude relationship between the key value of the data indicated by the index variable i of $D_1$ and the key value of the data indicated by the index variable j of $D_2$ is inverted from a previous magnitude relationship.

2. The parallel sorting processing method according to claim 1, wherein two processors are assigned to said partial data string pair in said sixth step, and the control information relating to parallel processing of merge processing is edited in the fifth step so that a first processor performs merge processing in descending order from a side of which a key value is greater in said partial data string and a second processor performs merge processing in ascending order from an edge of which a key value is smaller in the same partial data string simultaneously in said seventh step.

3. A computer readable storage medium that stores a program for performing parallel sorting processing using a parallel processor which includes a plurality of processors, where (i) one unsorted data string, or (ii) two or more sorted partial data strings are received as an input, the program comprising instructions that execute:

if the input is one unsorted data string, a first step of dividing the unsorted data string to generate a plurality of unsorted partial data strings;

a second step of assigning a processor to said plurality of unsorted partial data strings respectively;

a third step of sorting each of said plurality of unsorted partial data strings independently by the assigned processor based on an arbitrary algorithm, to generate sorted partial data strings, the arbitrary algorithm sorting the plurality of unsorted partial data strings each in one of either ascending or descending order;

a fourth step of creating an input data string pair for sorting using two sorted partial data strings which were generated in the third step or a seventh step or that were received as the input, and dividing the pair into sub-divided partial data string pairs respectively under a predetermined division condition;

a fifth step of editing control information relating to parallel processing of merge processing, the control information for sorting of the divided partial data string pairs, the control information being information regarding at least the location of the plurality of divided partial data string pairs and the number of the plurality of divided partial data string pairs;

a sixth step of assigning a processor group to each of the sub-divided partial data string pairs;

the seventh step of performing merge processing in parallel by the assigned processors and outputting sorted partial data strings; and a step of repeating said fourth step to said seventh step using the merge-processed data strings as said partial data strings, wherein the above steps are applied when one unsorted data string is provided, and the first step to the third step are unnecessary if two or more sorted data strings are provided, and a repeat of said fourth step to said seventh step ends when the merge-processed sorted partial data strings become one data string;

the fourth step to the seventh step are executed once, and the repeat is not required if two sorted data strings are provided, wherein the following items are satisfied as the predetermined division condition in said fourth step, when a condition where data string pair $(D_1, n)$ and $(D_2, n)$ are divided into two partial data string pairs $\{(D_{11}, n_{11}), (D_{21}, n_{21})\}$ and $\{(D_{12}, n_{12}), (D_{22}, n_{22})\}$, is established, and also $$n_{11}+n_{21}=2x, \; n_{12}+n_{22}=2(n-x)$$

is established, where x is a half value of the number of data of the partial data string pair $\{(D_{11}, n_{11}), (D_{21}, n_{21})\}$, and is also the number of data of $D_{11}$ and $D_{21}$ when $n_{11}=n_{21}$, and wherein said fourth step has the following functions:

(1) an operation to divide a sorted data string pair $\{(D_1, n), (D_2, n)\}$ into k sets of segment pairs, which is equivalent to performing (k−1) sets of two-division operations in which a total of the number of data counted from a first part of $D_1$ and $D_2$ becomes 2x with changing a value of x, while considering a magnitude of the key values of both data strings; in this case, a sub-division problem of the sorted data string pair $\{(D_1, n), (D_2, n)\}$ to the k sets of segment pairs is replaced with the above-mentioned two-division problem of the data string that satisfies the items as the division condition in the fourth step;

(2) specifying a data position in the data string by an index value, the value sequentially increments with the index value of a first data in the data string $D_1$ or $D_2$ as 0, x indicates the number of data, but if the value of x itself is regarded as an index value, then [x] indicates the (x+1)th data counted as 1, 2, 3, . . . from the first part of the data string;

if $n_{11}=n_{21}$, then $n_{11}=n_{21}=x$, which is a formula indicating the number of data, can be interpreted that the position of the xth data counted from the first part, that is data with the index value x−1, is at a division boundary of $D_1$ and $D_2$;

(3) an area dividing function, comprising:

a step of setting said x as an initial value of a boundary index value for index variables i and j for specifying individual data in said data strings $D_1$ and $D_2$;

a comparison step of comparing a key value of data indicated by the index variable i of the data string $D_1$ and a key value of data indicated by the index variable j of the data string $D_2$;

a step of adding 1 to an index variable of the data with a greater key value, subtracting 1 from an index variable of the data with a smaller key value, then branching processing to said comparison step, if the key value of the data indicated by the index variable i of $D_1$ and the key value of the data indicated by the index variable j of $D_2$ are not the same in an initial comparison;

a step of adding 1 to the index variable of data with a greater key value, and subtracting 1 from the index variable of data with a smaller key value, then branching processing to said comparison step, if a magnitude relationship of the key value of data indicated by the index variable i of $D_1$ and the key value of data indicated by the index variable j of $D_2$ is unchanged in a second or later comparison;

a step of regarding the data indicated by the index variable i and the data indicated by the index variable j as a division boundary respectively, if the key value of the data indicated by the index variable i of $D_1$ and the key value of the data indicated by the index variable J of $D_2$ are the same in the initial comparison; and a step of comparing a greater one of the key value of $D_1$ and the key value of $D_2$ in a previous comparison operation with the greater one of the key value of $D_1$ and the key value of $D_2$ in a current comparison operation, and regarding the data with a smaller key value as the division boundary and regarding the data initially compared with this data as the other boundary, if the magnitude relationship between the key value of the data indicated by the index variable i of $D_1$ and the key value of the data indicated by the index variable J of $D_2$ is inverted from a previous magnitude relationship.

4. A method for performing parallel sorting processing using a parallel processor, where (i) one unsorted data string, or (ii) two or more sorted partial data strings are received as an input, the method comprising:

if the input is one unsorted data string, a first step of dividing the unsorted data string to generate a plurality of unsorted partial data strings;

a second step of assigning a processor to said plurality of unsorted partial data strings respectively;

a third step of sorting each of said plurality of unsorted partial data strings independently by the assigned processor based on an arbitrary algorithm, to generate sorted partial data strings, the arbitrary algorithm sorting the plurality of unsorted partial data strings each in one of either ascending or descending order;

a fourth step of creating an input data string pair for sorting using two of the sorted partial data strings which were acquired in the third step or a seventh step or that were received as the input, and dividing the pair into sets of partial data string pairs respectively under a predetermined division condition;

a fifth step of editing control information relating to parallel processing of merge processing, the control information for parallel sorting of the plurality of divided partial data string pairs, the control information being information regarding at least the location of the plurality of divided partial data string pairs and the number of the plurality of divided partial data string pairs;

a sixth step of assigning to the plurality of divided partial data string pairs a processor group for merging of the plurality of divided partial data string pairs;

the seventh step of performing merge processing by the assigned processor and outputting sorted partial data strings; and a step of repeating said fourth step to said seventh step using the merge-processed sorted partial data strings as said sorted partial data strings, wherein the above steps are applied when one unsorted data string is provided, and the first to the third steps are unnecessary if two or more sorted data strings are provided, and a repeat of said fourth to seventh steps ends when the merge-processed sorted partial data strings are merged into one data string;

if only two sorted data strings are provided, the fourth to seventh steps are executed only once, and the repeat is not required, wherein the following items are satisfied as the predetermined division condition in said fourth step, when a condition where data string pair $(D_1, n)$ and $(D_2, n)$ are divided into two partial data string pairs $\{(D_{11}, n_{11}), (D_{21}, n_{21})\}$ and $\{(D_{12}, n_{12}), (D_{22}, n_{22})\}$, is established, and also $$n_{11}+n_{21}=2x,\ n_{12}+n_{22}=2(n-x)$$

is established, where x is a half value of the number of data of the partial data string pair $\{(D_{11}, n_{11}), (D_{21}, n_{21})\}$, and is also the number of data of $D_{11}$ and $D_{21}$ when $n_{11}=n_{21}$, and wherein said fourth step has the following functions:

(1) an operation to divide a sorted data string pair $\{(D_1, n), (D_2, n)\}$ into k sets of segment pairs, which is equivalent to performing (k−1) sets of two-division operations in which the total of the number of data counted from the first part of $D_1$ and $D_2$ becomes 2x with changing the value of x, while considering a magnitude of key values of both data strings;

(2) specifying a data position of the data string by an index value, the value sequentially increments with the index value of a first data in $D_1$ or $D_2$ as 0, x indicates the number of data, but if the value of x itself is regarded as an index value, then [x] indicates the (x+1)th data counted from the first part in the data strings;

if $n_{11}=n_{21}$, then $n_{11}=n_{21}=x$ indicates that the division boundary of $D_1$ and $D_2$ exists at the position of the xth data counted from a first part, that is at the data position of the index value x−1;

(3) an area division function, comprising:

a step of setting said x−1 as an initial value of a boundary index value for index variables i and j for specifying individual data in said data strings $D_1$ and $D_2$;

a comparison step of comparing a key value of data indicated by the index variable i of the data string $D_1$ and a key value of data indicated by the index variable j of the data string $D_2$;

a step of adding 1 to an index variable of the data with a greater key value, subtracting 1 from an index variable of the data with a smaller key value, then branching processing to said comparison step, when the key value of the data indicated by the index variable i of $D_1$ and the key value of the data indicated by the index variable J of $D_2$ are not the same in an initial comparison;

a step of adding 1 to an index variable of the data with a greater key value, subtracting 1 from an index variable of the data with a smaller key value, then branching processing to said comparison step, if a magnitude relationship of the key value of the data indicated by the index variable i of $D_1$ and the key value of the data indicated by the index variable j of $D_2$ is unchanged in the second or later comparison;

a step of regarding the data indicated by the index variable i and the data indicated by the index variable j as a division boundary respectively, when the key value of the data indicated by the index variable i of $D_1$ and the key value of the data indicated by the index variable j of $D_2$ are the same in the initial comparison; and a step of comparing the smaller one of the key value of $D_1$ and the key value of $D_2$ in the previous comparison operation with the smaller one of the key value of $D_1$ and the key value of $D_2$ in the current comparison operation, and regarding the data with a greater key value as a division boundary, and regarding the data initially compared with this data as another boundary, if the magnitude relationship between the key value of the data indicated by the index variable i of $D_1$ and the key value of the data indicated by the index variable of $D_2$ is inverted from a previous magnitude relationship.

* * * * *